United States Patent
Laselva et al.

(10) Patent No.: US 12,155,483 B2
(45) Date of Patent: Nov. 26, 2024

(54) CONTROLLING DUPLICATE TRANSMISSIONS IN MULTI-CONNECTIVITY MODE

(71) Applicant: NOKIA TECHNOLOGIES OY, Espoo (FI)

(72) Inventors: Daniela Laselva, Klarup (DK); Dawid Koziol, Wroclaw (PL); Ping-Heng Kuo, London (GB)

(73) Assignee: Nokia Technologies Oy, Espoo (FI)

( * ) Notice: Subject to any disclaimer, the term of this patent is extended or adjusted under 35 U.S.C. 154(b) by 248 days.

(21) Appl. No.: 17/771,988

(22) PCT Filed: Oct. 28, 2020

(86) PCT No.: PCT/EP2020/080280
§ 371 (c)(1),
(2) Date: Apr. 26, 2022

(87) PCT Pub. No.: WO2021/083957
PCT Pub. Date: May 6, 2021

(65) Prior Publication Data
US 2022/0407621 A1 Dec. 22, 2022

Related U.S. Application Data

(60) Provisional application No. 62/929,520, filed on Nov. 1, 2019.

(51) Int. Cl.
*H04W 4/00* (2018.01)
*H04L 1/08* (2006.01)
*H04W 76/15* (2018.01)

(52) U.S. Cl.
CPC ............. *H04L 1/08* (2013.01); *H04W 76/15* (2018.02)

(58) Field of Classification Search
CPC ..... H04L 1/08; H04L 2001/0097; H04W 76/15
(Continued)

(56) References Cited

U.S. PATENT DOCUMENTS

2018/0367288 A1 12/2018 Vrzic et al.
2018/0368107 A1* 12/2018 Babaei .................. H04W 76/00
(Continued)

OTHER PUBLICATIONS

International Search Report and Written Opinion dated Apr. 7, 2021 corresponding to International Patent Application No. PCT/EP2020/080280.
(Continued)

*Primary Examiner* — Chuong T Ho
(74) *Attorney, Agent, or Firm* — Barta Jones, PLLC

(57) ABSTRACT

There is provided a solution for performing packet duplication in a wireless network. According to an aspect, a method comprises: receiving, by a terminal device from a first access node, a first message comprising at least one information element indicating activation of at least one transmission leg of a first subset of transmission legs, hosted by the first access node, to deliver a duplicate of a data packet between the terminal device and the first access node, receiving, by the terminal device from a second access node, a second message comprising at least one information element indicating activation of at least one transmission leg of a second subset of transmission legs, hosted by the second access node, to deliver a duplicate of a data packet between the terminal device and the second access node, transmitting, by the terminal device, to the first access node at least one duplicate of the data packet over the at least one transmission leg indicated in the first message, and transmitting to the second access node at least one duplicate of the data packet over the at least one transmission leg indicated in the second message.

17 Claims, 8 Drawing Sheets

(58) Field of Classification Search
USPC .................................................. 370/329, 330
See application file for complete search history.

(56) References Cited

U.S. PATENT DOCUMENTS

| | | | |
|---|---|---|---|
| 2018/0368132 A1* | 12/2018 | Babaei | H04W 76/11 |
| 2020/0322094 A1* | 10/2020 | Dudda | H04L 1/188 |
| 2020/0374964 A1* | 11/2020 | Wang | H04W 76/15 |
| 2021/0126746 A1* | 4/2021 | Li | H04L 5/0055 |
| 2021/0400529 A1* | 12/2021 | Wang | H04L 1/1887 |
| 2021/0400643 A1* | 12/2021 | Yang | H04L 1/08 |

OTHER PUBLICATIONS

Ericsson, "Email discussion report for [106#55][NR/IIOT] Network Control of PDCP Duplication Enhancements," 3GPP Draft, R2-1909939, 3GPP TSG-RAN WG2 #107, Prague, Czech Republic, Aug. 26-30, 2019, Aug. 15, 2019, XP051767730.
Huawei, "Dynamic control of UL duplication," 3GPP Draft, R3-192936, 3GPP TSG-RAN3 Meeting #104, Reno, Nevada, May 13-17, 2019, May 13, 2019, XP051732201.
Nokia et al., "Duplication with multiple legs in SgNB," 3GPP Draft, R3-180218, 3GPP TSG-RAN WG3 Meeting #103, Athens, Greece, Feb. 25-Mar. 1, 2019, Feb. 16, 2019, XP051604161.
Vivo, "Remaining issues of the network-controlled duplication," 3GPP Draft; R2-1912321, 3GPP TSG-RAN WG2 Meeting #107bis, Chongqing, China, Oct. 14-18, 2019, Oct. 4, 2019, XP051804401.
Notification of Transmittal of the International Preliminary Report on Patentability and PCT International Preliminary Report on Patentability dated Dec. 7, 2021 corresponding to International Patent Application No. PCT/EP2020/080280.

* cited by examiner

| R | R | LCID | | |
|---|---|---|---|---|
| CG | R0 | R1 | R2 | DRB ID |

CONTROLLING DUPLICATE TRANSMISSIONS IN MULTI-CONNECTIVITY MODE

TECHNICAL FIELD

The invention relates to communications in a system suitable for packet delivery with regard to multi-connectivity, dual-connectivity, carrier aggregation or like scenarios.

BACKGROUND

Multi-connectivity or dual-connectivity of a terminal device to multiple radio access points is a 5G key enabler in order to satisfy the demanding requirements of 5G mobile networks. Multi-connectivity supports simultaneous connectivity to multiple radio access points and aggregation within and across different radio access technologies such as 5G and 4G as well as technologies operating over unlicensed spectrum. In addition, it provides connectivity to multiple network layers such as macro and small cells and radio accesses operating at different frequency bands such as below 6 GHz and millimeter wave (mmWave, above 6 GHz). Carrier aggregation is a key technology in LTE Advanced (LTE-A) and NR to enable higher capacities in radio networks.

BRIEF DESCRIPTION

According to an aspect, there is provided the subject matter of the independent claims. Some embodiments are defined in the dependent claims.

The embodiments and features, if any, described in this specification that do not fall under the scope of the independent claims are to be interpreted as examples useful for understanding various embodiments of the invention. Some aspects of the disclosure are defined by the independent claims.

One or more examples of implementations are set forth in more detail in the accompanying drawings and the description below. Other features will be apparent from the description and drawings, and from the claims.

According to an aspect, there is provided an apparatus for a first access node, comprising means for performing: transmitting, to a second access node, a first message comprising at least one information element indicating whether or not the second access node is enabled to decide an activation status of a subset of transmission legs configured to deliver duplicates of data packets from a terminal device; transmitting, to the terminal device, a second message comprising at least one information element indicating activation of at least one transmission leg to deliver a duplicate of a data packet between the terminal device and the first access node, and communicating, with the terminal device, at least one duplicate of the data packet over the at least one transmission leg.

In an embodiment, the at least one transmission leg includes at least one transmission leg excluded from the subset of transmission legs.

In an embodiment, the at least one information element of the first message enables the second access node to decide the activation status of the subset of transmission legs, and the at least one information element of the second message indicates the activation status of only transmission legs hosted by the first access node.

In an embodiment, the at least one information element of the first message disables the second access node from deciding the activation status of the subset of transmission legs, and the at least one information element of the second message indicates the activation status of all the transmission legs configured to deliver duplicates of data packets.

In an embodiment, the subset of transmission legs are established between the second access node and the terminal device, and the means are configured to receive from the second access node radio measurement data indicating quality of a radio channel of the subset of transmission legs and to decide the activation status of the subset of the transmission legs on the basis of the radio measurement data.

In an embodiment, the first message further comprises a second information element indicating a number of duplicates that shall be transmitted.

In an embodiment, the means are configured to receive a third message from the second access node, the third message comprising at least one information element indicating a change in the activation status of the subset of transmission legs, to change a number of transmission legs in the subset of transmission legs on the basis of the received third message, and to transmit to the second access node a fourth message indicating a new number of transmission legs in the subset.

In an embodiment, the first message further comprises at least one information element indicating a transmission mode for transmitting the duplicates of the data packets over the subset of transmission legs, wherein the transmission mode is one of at least a first transmission mode and a second transmission mode, wherein duplicates shall be transmitted simultaneously over all activated transmission legs of the subset in the first transmission mode, and wherein at least one duplicate shall be transmitted over one activated transmission leg of the subset after another duplicate over another activated transmission leg of the subset in the second transmission mode.

In an embodiment, the first access node is a master access node and the second access node is a secondary access node.

In an embodiment, only the first access node amongst the first access node and the second access node hosts a packet data convergence protocol layer of the terminal device.

In an embodiment, the second message further comprises an information element indicating whether or not the terminal device shall ignore contradicting activation status decisions made by the second access node.

According to another aspect, there is provided an apparatus for a first access node, comprising means for performing: receiving, from a second access node, a first message comprising at least one information element indicating whether or not the first access node is enabled to decide an activation status of a subset of transmission legs configured to deliver duplicates of data packets from a terminal device; transmitting, to the terminal device, a second message comprising at least one information element indicating activation of at least one transmission leg of the subset to deliver a duplicate of a data packet between the terminal device and the first access node, and communicating, with the terminal device, at least one duplicate of the data packet over the at least one transmission leg.

In an embodiment, the at least one information element of the first message enables the apparatus to decide the activation status of the subset of transmission legs, and the means are configured to decide, on the basis of the at least one information element of the first message, whether or not to activate each transmission leg of the subset to transmit duplicates of a data packet and to generate the second message on the basis of the decision.

In an embodiment, the means are configured to receive, from the second access node, a third message comprising at least one information element disabling the apparatus from deciding the activation status of the subset of transmission legs, and the means are configured to disable decision-making regarding the activation status of the subset of transmission legs on the basis of the at least one information element of the third message.

In an embodiment, the first message further comprises a second information element indicating a number of that shall be transmitted, and the means are configured to insert to the second message an information element indicating the number of duplicates that shall be transmitted over the activated transmission legs indicated by the second message.

In an embodiment, the means are configured to determine to change the activation status of the subset of transmission legs, and to transmit to the second access node a fourth message comprising at least one information element indicating, the change in the activation status of the subset of transmission legs.

In an embodiment, the second message further comprises at least one information element indicating a transmission mode for transmitting the duplicates of the data packets over the at least one transmission leg, wherein the transmission mode is one of at least a first transmission mode and a second transmission mode, wherein duplicates shall be transmitted simultaneously over all activated transmission legs of the subset in the first transmission mode, and wherein at least one duplicate shall be transmitted over one activated transmission leg of the subset after another duplicate over another activated transmission leg of the subset in the second transmission mode.

In an embodiment, the first access node is a secondary access node and the second access node is a master access node.

In an embodiment, only the second access node amongst the first access node and the second access node hosts a packet data convergence protocol layer of the terminal device.

According to an aspect, there is provide an apparatus for a terminal device, comprising means for performing: receiving, from a first access node, a first message comprising at least one information element indicating activation of at least one transmission leg of a first subset of transmission legs, hosted by the first access node, to deliver a duplicate of a data packet between the terminal device and the first access node, receiving, from a second access node, a second message comprising at least one information element indicating activation of at least one transmission leg of a second subset of transmission legs, hosted by the second access node, to deliver a duplicate of a data packet between the terminal device and the second access node, transmitting to the first access node at least one duplicate of the data packet over the at least one transmission leg indicated in the first message, and transmitting to the second access node at least one duplicate of the data packet over the at least one transmission leg indicated in the second message.

In an embodiment, the first subset and second subset are mutually exclusive.

In an embodiment, at least the first message comprises a second information element indicating whether or not the first message applies to all transmission legs configured to deliver duplicates of data packets or only to the first subset of transmission legs.

In an embodiment, if the second information element of the first message indicates that the first message applies to all transmission legs configured to deliver duplicates of data packets, the means are configured to ignore the second message.

In an embodiment, the first message and the second message comprises an information element indicating a transmission mode for transmitting the duplicates of the data packets over the transmission legs, wherein the transmission mode is one of at least a first transmission mode and a second transmission mode, wherein duplicates shall be transmitted simultaneously over all activated transmission legs of the subset in the first transmission mode, and wherein at least one duplicate shall be transmitted over one activated transmission leg of the subset after another duplicate over another activated transmission leg of the subset in the second transmission mode.

In an embodiment, the first message indicates the first transmission mode for the first subset of transmission legs, and the second message indicates the second transmission mode for the second subset of transmission legs.

In an embodiment, the first subset of transmission legs comprises at least one transmission leg hosted by the master access node, and the second subset of transmission legs comprises at least one transmission leg hosted by the secondary access node.

In an embodiment, the first access node is a master access node and the second access node is a secondary access node.

In an embodiment, the first message further comprises an information element indicating whether or not the apparatus shall ignore contradicting activation status decisions made by another access node or nodes, and the means are configured to solve a contradictive indication between the first message and the second message on the basis of the information element.

According to another aspect, there is provided an apparatus for a terminal device, comprising means for performing: receiving, from a first access node, a first message comprising a first information element indicating activation of at least one transmission leg configured to deliver a duplicate of a data packet between the terminal device and the first access node, wherein the first message further comprises a second information element indicating whether or not the first message applies to all transmission legs configured at the terminal device to deliver duplicates of data packets or only to a first subset of the transmission legs; if the second information element indicates that the first message applies to all transmission legs, communicating at least one duplicate of the data packet over the at least one transmission leg indicated by the first information element; if the second information element indicates that the first message applies only to the first subset of the transmission legs, determining an activation status of at least one transmission leg of a second subset of transmission legs on the basis of a second message received from a second access node, the second message comprising a third information element indicating activation of the at least one transmission leg of the second subset of transmission legs, and communicating duplicates of the data packet over the transmission legs indicated by the first information element and the third information element.

In an embodiment, the means are configured to, if the second information element indicates that the first message applies only to the first subset of the transmission legs, maintain the activation status of the at least one transmission leg of the second subset of transmission legs as a response to the first message.

According to another aspect, there is provided an apparatus for an access node, comprising means for performing:

transmitting, to a terminal device, a message comprising a first information element indicating activation of at least one transmission leg configured to deliver a duplicate of a data packet between the terminal device and the access node, wherein the first message further comprises a second information element indicating whether or not the first message applies to all transmission legs configured at the terminal device to deliver duplicates of data packets or only to a first subset of the transmission legs; and communicating with the terminal device a duplicate of the data packet over the at least one transmission leg indicated by the first information element.

In an embodiment, the means comprises: at least one processor; and at least one memory including computer program code, the at least one memory and computer program code configured to, with the at least one processor, cause the performance of the apparatus.

According to another aspect, there is provided a method comprising: transmitting, by a first access node to a second access node, a first message comprising at least one information element indicating whether or not the second access node is enabled to decide an activation status of a subset of transmission legs configured to deliver duplicates of data packets from a terminal device; transmitting, by the first access node to the terminal device, a second message comprising at least one information element indicating activation of at least one transmission leg to deliver a duplicate of a data packet between the terminal device and the first access node, and communicating, by the first access node with the terminal device, at least one duplicate of the data packet over the at least one transmission leg.

In an embodiment, the at least one transmission leg includes at least one transmission leg excluded from the subset of transmission legs.

In an embodiment, the at least one information element of the first message enables the second access node to decide the activation status of the subset of transmission legs, and the at least one information element of the second message indicates the activation status of only transmission legs hosted by the first access node.

In an embodiment, the at least one information element of the first message disables the second access node from deciding the activation status of the subset of transmission legs, and wherein the at least one information element of the second message indicates the activation status of all the transmission legs configured to deliver duplicates of data packets.

In an embodiment, the subset of transmission legs are established between the second access node and the terminal device, and the first access node receives from the second access node radio measurement data indicating quality of a radio channel of the subset of transmission legs and decides the activation status of the subset of the transmission legs on the basis of the radio measurement data.

In an embodiment, the first message further comprises a second information element indicating a number of duplicates that shall be transmitted.

In an embodiment, the first access node receives a third message from the second access node, the third message comprising at least one information element indicating a change in the activation status of the subset of transmission legs, changes a number of transmission legs in the subset of transmission legs on the basis of the received third message, and transmits to the second access node a fourth message indicating a new number of transmission legs in the subset.

In an embodiment, the first message further comprises at least one information element indicating a transmission mode for transmitting the duplicates of the data packets over the subset of transmission legs, wherein the transmission mode is one of at least a first transmission mode and a second transmission mode, wherein duplicates shall be transmitted simultaneously over all activated transmission legs of the subset in the first transmission mode, and wherein at least one duplicate shall be transmitted over one activated transmission leg of the subset after another duplicate over another activated transmission leg of the subset in the second transmission mode.

In an embodiment, the first access node is a master access node and the second access node is a secondary access node.

In an embodiment, only the first access node amongst the first access node and the second access node hosts a packet data convergence protocol layer of the terminal device.

In an embodiment, the second message further comprises an information element indicating whether or not the terminal device shall ignore contradicting activation status decisions made by the second access node.

According to another aspect, there is provided a method comprising: receiving, by a first access node from a second access node, a first message comprising at least one information element indicating whether or not the first access node is enabled to decide an activation status of a subset of transmission legs configured to deliver duplicates of data packets from a terminal device; transmitting, by the first access node to the terminal device, a second message comprising at least one information element indicating activation of at least one transmission leg of the subset to deliver a duplicate of a data packet between the terminal device and the first access node, and communicating, by the first access node with the terminal device, at least one duplicate of the data packet over the at least one transmission leg.

In an embodiment, the at least one information element of the first message enables the apparatus to decide the activation status of the subset of transmission legs, and the first access node decides, on the basis of the at least one information element of the first message, whether or not to activate each transmission leg of the subset to transmit duplicates of a data packet and to generate the second message on the basis of the decision.

In an embodiment, the first access node receives, from the second access node, a third message comprising at least one information element disabling the apparatus from deciding the activation status of the subset of transmission legs, and disables decision-making regarding the activation status of the subset of transmission legs on the basis of the at least one information element of the third message.

In an embodiment, the first message further comprises a second information element indicating a number of that shall be transmitted, and the first access node inserts to the second message an information element indicating the number of duplicates that shall be transmitted over the activated transmission legs indicated by the second message. In an embodiment, the first access node determines to change the activation status of the subset of transmission legs, and transmits to the second access node a fourth message comprising at least one information element indicating, the change in the activation status of the subset of transmission legs.

In an embodiment, the second message further comprises at least one information element indicating a transmission mode for transmitting the duplicates of the data packets over the at least one transmission leg, wherein the transmission mode is one of at least a first transmission mode and a second transmission mode, wherein duplicates shall be transmitted simultaneously over all activated transmission legs of the subset in the first transmission mode, and wherein at least one duplicate shall be transmitted over one activated transmission leg of the subset after another duplicate over another activated transmission leg of the subset in the second transmission mode.

In an embodiment, the first access node is a secondary access node and the second access node is a master access node.

In an embodiment, only the second access node amongst the first access node and the second access node hosts a packet data convergence protocol layer of the terminal device.

According to another aspect, there is provided a method comprising: receiving, by a terminal device from a first access node, a first message comprising at least one information element indicating activation of at least one transmission leg of a first subset of transmission legs, hosted by the first access node, to deliver a duplicate of a data packet between the terminal device and the first access node, receiving, by the terminal device from a second access node, a second message comprising at least one information element indicating activation of at least one transmission leg of a second subset of transmission legs, hosted by the second access node, to deliver a duplicate of a data packet between the terminal device and the second access node, transmitting, by the terminal device, to the first access node at least one duplicate of the data packet over the at least one transmission leg indicated in the first message, and transmitting to the second access node at least one duplicate of the data packet over the at least one transmission leg indicated in the second message.

In an embodiment, the first subset and second subset are mutually exclusive.

In an embodiment, at least the first message comprises a second information element indicating whether or not the first message applies to all transmission legs configured to deliver duplicates of data packets or only to the first subset of transmission legs.

In an embodiment, if the second information element of the first message indicates that the first message applies to all transmission legs configured to deliver duplicates of data packets, the terminal device ignores the second message.

In an embodiment, the first message and the second message comprises an information element indicating a transmission mode for transmitting the duplicates of the data packets over the transmission legs, wherein the transmission mode is one of at least a first transmission mode and a second transmission mode, wherein duplicates shall be transmitted simultaneously over all activated transmission legs of the subset in the first transmission mode, and wherein at least one duplicate shall be transmitted over one activated transmission leg of the subset after another duplicate over another activated transmission leg of the subset in the second transmission mode.

In an embodiment, the first message indicates the first transmission mode for the first subset of transmission legs, and the second message indicates the second transmission mode for the second subset of transmission legs.

In an embodiment, the first subset of transmission legs comprises at least one transmission leg hosted by the master access node, and the second subset of transmission legs comprises at least one transmission leg hosted by the secondary access node.

In an embodiment, the first access node is a master access node and the second access node is a secondary access node.

In an embodiment, the first message further comprises an information element indicating whether or not the apparatus shall ignore contradicting activation status decisions made by another access node or nodes, and wherein the terminal device solves a contradictive indication between the first message and the second message on the basis of the information element.

According to another aspect, there is provided a method comprising: receiving, by a terminal device from a first access node, a first message comprising a first information element indicating activation of at least one transmission leg configured to deliver a duplicate of a data packet between the terminal device and the first access node, wherein the first message further comprises a second information element indicating whether or not the first message applies to all transmission legs configured at the terminal device to deliver duplicates of data packets or only to a first subset of the transmission legs; if the second information element indicates that the first message applies to all transmission legs, communicating by the terminal device at least one duplicate of the data packet over the at least one transmission leg indicated by the first information element; if the second information element indicates that the first message applies only to the first subset of the transmission legs, determining by the terminal device an activation status of at least one transmission leg of a second subset of transmission legs on the basis of a second message received from a second access node, the second message comprising a third information element indicating activation of the at least one transmission leg of the second subset of transmission legs, and communicating by the terminal device duplicates of the data packet over the transmission legs indicated by the first information element and the third information element.

In an embodiment, the means are configured to, if the second information element indicates that the first message applies only to the first subset of the transmission legs, maintain the activation status of the at least one transmission leg of the second subset of transmission legs as a response to the first message.

According to another aspect, there is provided a method comprising: transmitting, by an access node to a terminal device, a message comprising a first information element indicating activation of at least one transmission leg configured to deliver a duplicate of a data packet between the terminal device and the access node, wherein the first message further comprises a second information element indicating whether or not the first message applies to all transmission legs configured at the terminal device to deliver duplicates of data packets or only to a first subset of the transmission legs; and communicating, by the access node with the terminal device, a duplicate of the data packet over the at least one transmission leg indicated by the first information element.

According to another aspect, there is provided a computer program product embodied on a computer-readable medium and comprising a computer program code readable by a computer, wherein the computer program code configures the computer to carry out a computer process comprising: transmitting, by a first access node to a second access node, a first message comprising at least one information element indicating whether or not the second access node is enabled to decide an activation status of a subset of transmission legs configured to deliver duplicates of data packets from a terminal device; transmitting, by the first access node to the terminal device, a second message comprising at least one information element indicating activation of at least one transmission leg to deliver a duplicate of a data packet between the terminal device and the first access node, and communicating, by the first access node with the terminal device, at least one duplicate of the data packet over the at least one transmission leg.

According to another aspect, there is provided a computer program product embodied on a computer-readable medium and comprising a computer program code readable by a computer, wherein the computer program code configures the computer to carry out a computer process comprising: receiving, by a first access node from a second access node, a first message comprising at least one information element indicating whether or not the first access node is enabled to decide an activation status of a subset of transmission legs configured to deliver duplicates of data packets from a terminal device; transmitting, by the first access node to the terminal device, a second message comprising at least one information element indicating activation of at least one transmission leg of the subset to deliver a duplicate of a data packet between the terminal device and the first access node, and communicating, by the first access node with the terminal device, at least one duplicate of the data packet over the at least one transmission leg.

According to another aspect, there is provided a computer program product embodied on a computer-readable medium and comprising a computer program code readable by a computer, wherein the computer program code configures the computer to carry out a computer process comprising: receiving, by a terminal device from a first access node, a first message comprising at least one information element indicating activation of at least one transmission leg of a first subset of transmission legs, hosted by the first access node, to deliver a duplicate of a data packet between the terminal device and the first access node, receiving, by the terminal device from a second access node, a second message comprising at least one information element indicating activation of at least one transmission leg of a second subset of transmission legs, hosted by the second access node, to deliver a duplicate of a data packet between the terminal device and the second access node, transmitting, by the terminal device, to the first access node at least one duplicate of the data packet over the at least one transmission leg indicated in the first message, and transmitting to the second access node at least one duplicate of the data packet over the at least one transmission leg indicated in the second message.

According to another aspect, there is provided a computer program product embodied on a computer-readable medium and comprising a computer program code readable by a computer, wherein the computer program code configures the computer to carry out a computer process comprising: receiving, by a terminal device from a first access node, a first message comprising a first information element indicating activation of at least one transmission leg configured to deliver a duplicate of a data packet between the terminal device and the first access node, wherein the first message further comprises a second information element indicating whether or not the first message applies to all transmission legs configured at the terminal device to deliver duplicates of data packets or only to a first subset of the transmission legs; if the second information element indicates that the first message applies to all transmission legs, communicating by the terminal device at least one duplicate of the data packet over the at least one transmission leg indicated by the first information element; if the second information element indicates that the first message applies only to the first subset of the transmission legs, determining by the terminal device an activation status of at least one transmission leg of a second subset of transmission legs on the basis of a second message received from a second access node, the second message comprising a third information element indicating activation of the at least one transmission leg of the second subset of transmission legs, and communicating by the terminal device duplicates of the data packet over the transmission legs indicated by the first information element and the third information element.

According to another aspect, there is provided a computer program product embodied on a computer-readable medium and comprising a computer program code readable by a computer, wherein the computer program code configures the computer to carry out a computer process comprising: transmitting, by an access node to a terminal device, a message comprising a first information element indicating activation of at least one transmission leg configured to deliver a duplicate of a data packet between the terminal device and the access node, wherein the first message further comprises a second information element indicating whether or not the first message applies to all transmission legs configured at the terminal device to deliver duplicates of data packets or only to a first subset of the transmission legs; and communicating, by the access node with the terminal device, a duplicate of the data packet over the at least one transmission leg indicated by the first information element.

BRIEF DESCRIPTION OF DRAWINGS

In the following some embodiments will be described with reference to the attached drawings, in which.

DETAILED DESCRIPTION OF SOME EMBODIMENTS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplifying embodiments will be described using, as an example of an access architecture to which the embodiments may be applied, a radio access architecture based on long term evolution advanced (LTE Advanced, LTE-A) or new radio (NR) (or can be referred to as 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or Wi-Fi), worldwide interoperability for microwave access (WiMAX)), systems using ultra-wideband (UWB) technology, sensor networks, mobile ad-hoc networks (MANETs) and Internet Protocol multimedia subsystems (IMS) or any combination thereof.

Figure 1:
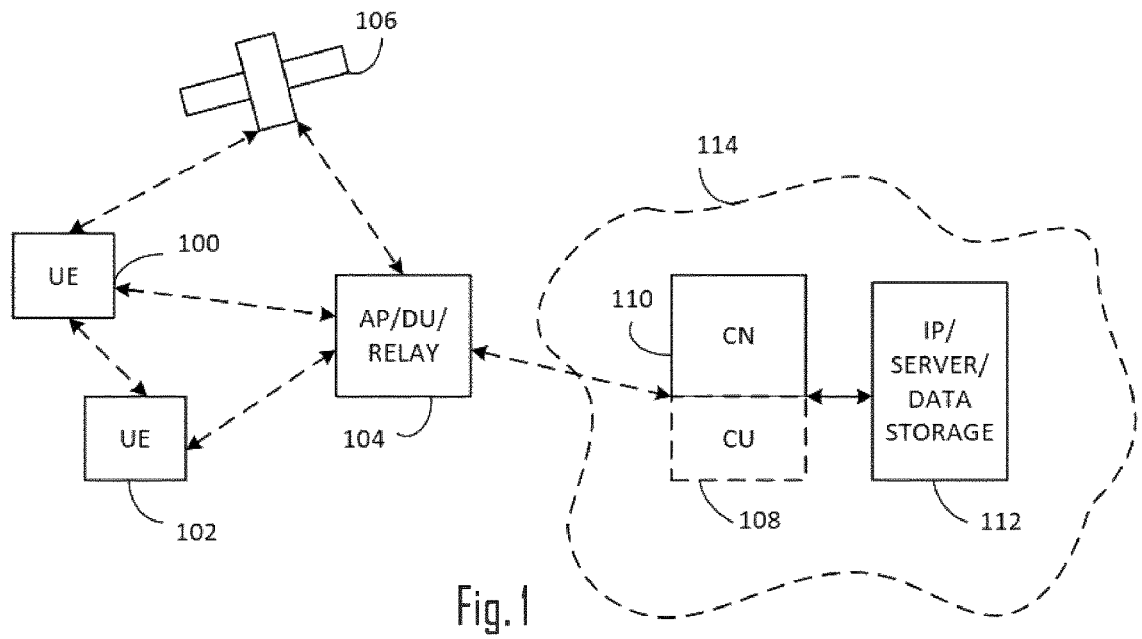
FIG. 1 illustrates an example of a wireless network to which embodiments of the invention may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node 104 (such as (e/g)NodeB) providing the cell. The link from a user device to a (e/g)NodeB is called uplink (UL) or reverse link and the physical link from the (e/g)NodeB to the user device is called downlink or forward link. The links may comprise a physical link. It should be appreciated that (e/g)NodeBs or their functionalities may be implemented by using any node, host, server or access point etc. entity suitable for such a usage. Said node 104 may be referred to as network node 104 or network element 104 in a broader sense.

A communications system typically comprises more than one (e/g)NodeB in which case the (e/g)NodeBs may also be configured to communicate with one another over links, wired or wireless, designed for the purpose. These links are sometimes called backhaul links that may be used for signaling purposes. The Xn interface is an example of such a link. The (e/g)NodeB is a computing device configured to control the radio resources of communication system it is coupled to. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements also referred to as antenna panels and transmission and reception points (TRP). The (e/g)NodeB is further connected to the core network 110 (CN or next generation core NGC). Depending on the system, the counterpart on the CN side can be a user plane function (UPF) (this may be 5G gateway corresponding to serving gateway (S-GW) of 4G) or access and mobility function (AMF) (this may correspond to mobile management entity (MME) of 4G).

The user device 100, 102 (also called UE, user equipment, user terminal, terminal device, mobile terminal, etc.) illustrates one type of an apparatus to which resources on the air interface are allocated and assigned, and thus any feature described herein with a user device may be implemented with a corresponding apparatus, such as a part of a relay node. An example of such a relay node is an integrated access and backhaul (IAB)-node (a.k.a. self-backhauling relay).

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink-only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device (or in some embodiments mobile terminal (MT) part of the relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 1, user devices may have one or more antennas. The number of reception and/or transmission antennas may naturally vary according to a current implementation.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and operability in different radio bands such as below 6 GHz-cmWave, below 6 GHz-cmWave-mmWave. One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio access and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side and non-real time functions being carried out in a centralized manner.

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figures 2A, 2B:
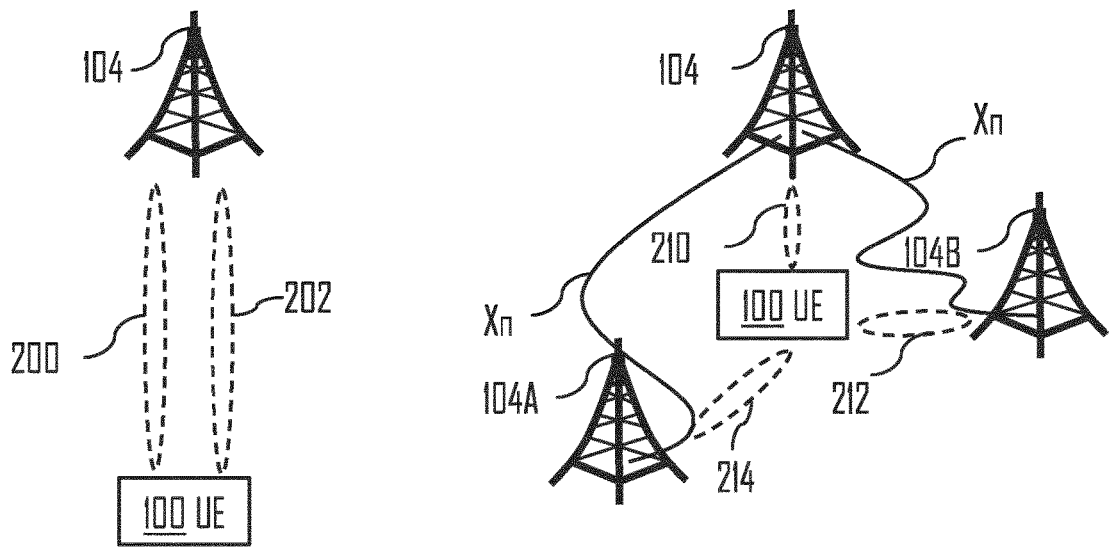
FIGS. 2A and 2B illustrate different multi-connectivity scenarios for a terminal device.

Packet duplication has been proposed as a mechanism for ultra-reliable low latency connections (URLLC). The duplication may be understood as a concept where the same packet is delivered from a source to a destination in multiple copies and via different routes that typically are uncorrelated to the largest possible extent. In this manner, the probability of the packet reaching the destination within a specific time frame is improved. One specific example of duplication is Carrier Aggregation (CA) duplication which can be understood as duplication with CA where logical channels of a duplicated radio bearer are mapped to different serving cells or carriers with the CA. FIG. 2A illustrates a scenario where the CA duplication is used between a single access node 104 and the UE 100. Multiple carriers 200, 202 may be configured between the access node 104 and the UE. The carriers 200, 202 may be configured, for example, with different beamforming configurations to provide spatial diversity for the duplication. Another type of diversity may be used as well. FIG. 2B illustrates a scenario where the duplication or multi-connectivity is used between the UE and several access nodes 104, 104A, 104B. Each access node 104, 104A, 104B may have configured at least one radio channel 210, 212, 214 for communication with the UE 100. The access node 104 may be a master access node of a connection of the UE, and the access nodes 104A, 104B may be secondary access nodes of the connection. A master access node may be a gNB serving as a master for the duplication (e.g. hosting the PDCP entity) and perform overall control and management of the communication of the UE 100 e.g. with respect to dual connectivity/carrier aggregation procedures. One or more secondary access nodes 104A, 104B may be gNBs that provide additional routes for duplicate packets via the respective radio channels. The concept of FIG. 2B where the UE 100 is simultaneously connected with multiple access nodes is called multi-connectivity, or multi-node connectivity, which is an extension to the dual connectivity concept. In the dual connectivity, the number of access nodes to which the UE 100 may be connected is limited to two.

An example of a protocol stack in the terminal device and the access nodes may be illustrated as:

| |
|---|
| PDCP |
| RLC |
| MAC |
| PHY |

The packet duplication can take place in the radio access network of the cellular communication system, e.g. on a radio protocol layer or on a higher layer. In the context of the present invention, radio duplication may be applied, in particular Packet Data Convergence Protocol (PDCP) layer duplication. In the PDCP duplication, the duplication of a data packet takes place on the PDCP layer. This means that a PDCP transmitter creates PDCP PDU duplicates and sends the duplicates to the two or more radio link control (RLC) layer entities that are associated to the duplicating PDCP layer entity, and deliver the PDCP duplicates to the receiver via different channels. The RLC entities may belong to the same access node, as in FIG. 2A, and the duplicates may be transferred from/to the terminal device via e.g. two or more component carriers managed by the same access node in a carrier aggregation mode. In another example, the RLC entities may belong to different access nodes, as in FIG. 2B, and the duplicates are transferred via distinct access node or nodes, such as a master access node and a secondary access node. In such case, the terminal device may be served in a dual-connectivity or multi-connectivity mode. A combination of the carrier aggregation and dual/multi connectivity is also a possible scenario.

At the receiver side, all transmissions will be processed and the related PDCP PDUs will be sent to the PDCP layer. The PDCP receiver will then take care of discarding duplicates, if any present.

Packet duplication may refer to duplication of control and/or user plane packets. In the packet duplication, as described above, data is duplicated on the PDCP layer of a source, e.g. the master access node or the terminal device, delivered independently via multiple radio paths, and processed at a receiver PDCP layer, resulting in an improvement of the achieved reliability. When the PDCP layer of the master access node performs the duplication, it may output one duplicate to the RLC layer of a secondary access node and one duplicate to the RLC layer of the master access node for delivery to the RLC layer entities of the terminal device. In a similar manner, the PDCP layer of the terminal device may be configured to transmit duplicates of an uplink data packet to a plurality of RLC entities established in the terminal device, each RLC entity connected to a different radio channel or access node. It is therefore a potential solution for URLLC applications, particularly for industrial use cases, with the aim of fulfilling their demanding reliability and latency targets. In general, URLLC is a key factor for many vertical markets, such as factory automation, smart cities, autonomous vehicles, public safety and remote healthcare.

The terminal device may have established a protocol data unit (PDU) session via the one or more access nodes, and the PDU session may comprise at least one corresponding data radio bearer for the terminal device. In the duplication in both scenarios of FIGS. 2A and 2B, a data packet of the same data radio bearer may be duplicated and transmitted over multiple different channels. In the multi-connectivity of FIG. 2B, the terminal device may have established a data radio bearer with the radio access network comprising the master access node and at least one of the secondary access nodes 104A, 104B. The data radio bearer may involve multiple above-described RLC entities that may be used to deliver the PDCP duplicates according to the principles described above. Each RLC entity may establish a transmission leg with the terminal device, and the term transmission leg is used below to describe an independent transmission path between the radio access network and the terminal device. At least one of the transmission legs may be established by at least one RLC entity in the master access node and at least one of the transmission legs may be established by at least one RLC entity in at least one of the secondary access nodes. An access node may establish one or multiple transmission legs to a UE, e.g. via different RLC entities. In other words, the access nodes 104, 104A, 104B may provide the terminal device with multiple transmission legs via which the terminal device may transmit duplicates of an uplink data packet. One of these transmission legs configured for a DRB may be configured as a primary transmission leg that is always active, i.e. cannot be deactivated, for transmission of at least control protocol data units (PDU). The primary transmission leg may remain as the only active transmission leg even when the duplication as a whole is deactivated.

3GPP specifications define that each terminal device (UE) has at least one PDU session. One or more QoS flows are associated to this PDU session. The QoS flows are then associated with the data radio bearers (DRBs). This is conducted on Service Data Adaptation Protocol (SDAP) protocol layer in the access node. This mapping may be based on 5G QoS class indices (5QI) in a transport header of a data packet, and on corresponding QoS parameters that are signaled from a core network when a PDU session is established. Multiple DRBs may be established for QoS flows requiring different packet forwarding requirements in terms of latency budget, packet loss rate tolerance, etc. The 5QI contains a set of default QoS parameters for a large number of services, e.g. the URLLC. The QoS parameters in the 5QI table include a resource type (guaranteed bit rate (GBR), delay critical GBR, and non-GBR), priority, packet delay budget, packet error rate, and averaging window.

Recent development of the PDCP duplication in uplink has led to the support of dynamic activation and deactivation of the transmission legs to be used for uplink duplication, thus controlling the number of duplicates the terminal device transmits via the active transmission legs. The activation status of the transmission legs can be network controlled and, in this case, is signalled to the terminal device in a specific control element (CE) e.g. on the MAC layer, i.e. via a MAC CE. In some cases, the configured primary path may be static and always active, so the network can only control N−1 out of the N legs configured for a data radio bearer. In the multi-connectivity scenario of FIG. 2B, the dynamic activation of the transmission legs may raise problems related to coordinating the activation between the access nodes. The coordination may involve additional signalling and delays between the access nodes that may increase latency in the data transmission and/or cause contradictory activation status information transmitted by the access nodes to the terminal device.

Figure 3A:
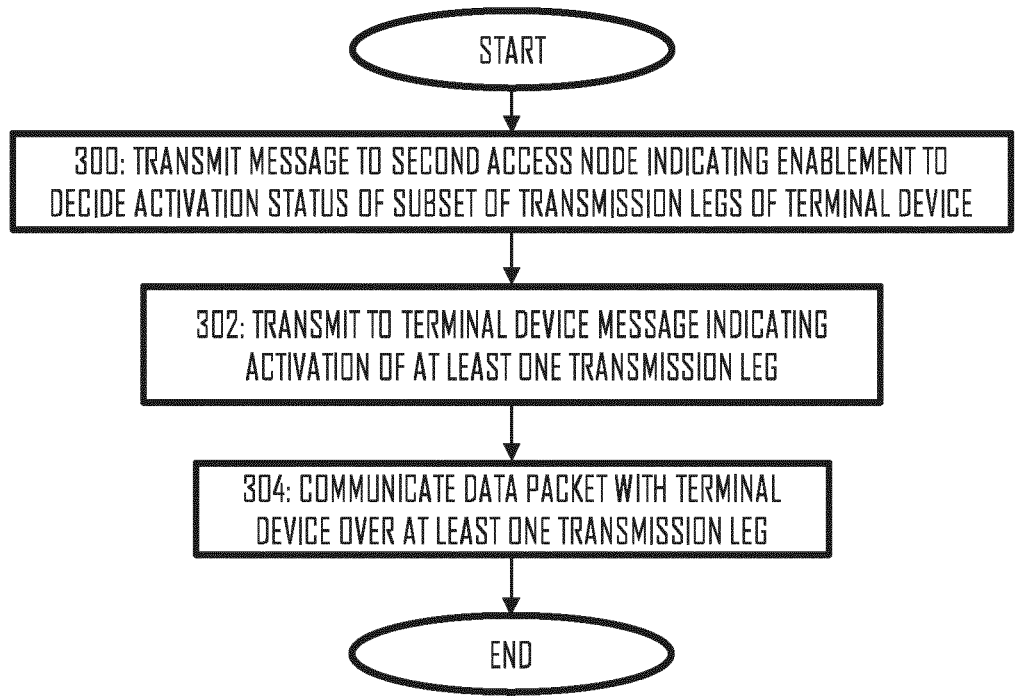
FIGS. 3A, 3B, 4, 5A, and 5B illustrate some embodiments for indicating an activation status of transmission legs to a terminal device in a multi-connectivity scenario.
Figure 4:
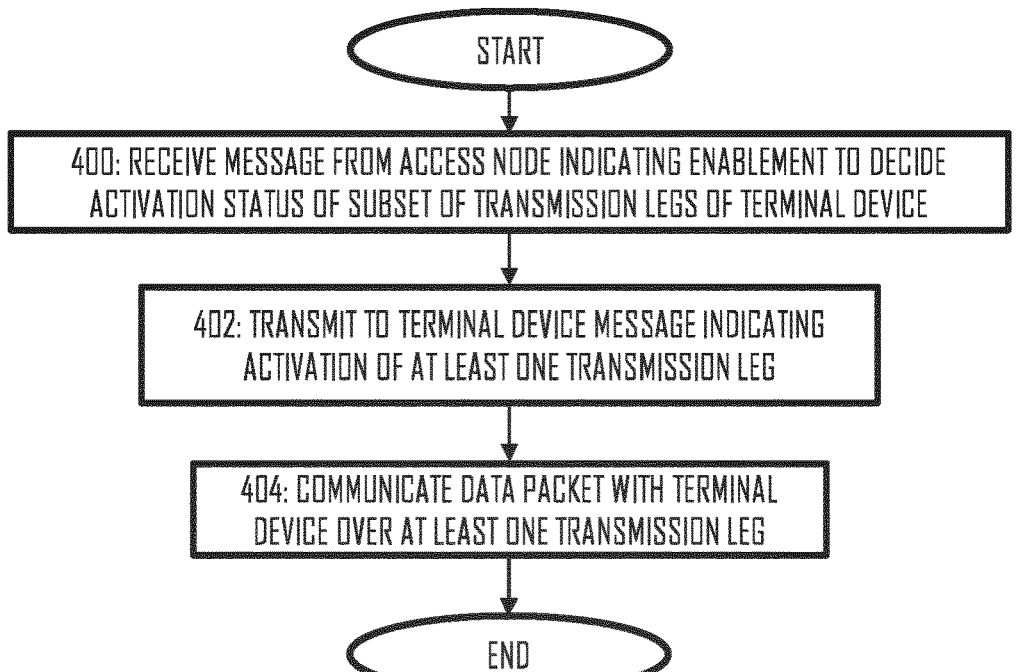
Figure 5A:
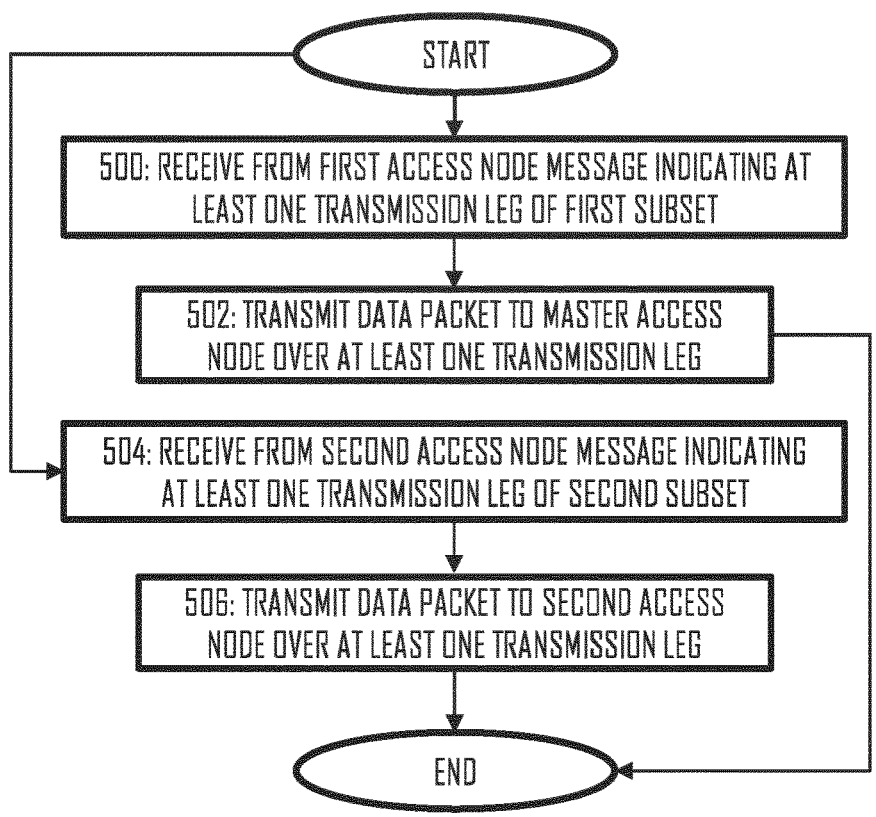

FIGS. 3A, 4, and 5A illustrate some embodiments for performing dynamic changing of the transmission legs used for delivering duplicates of uplink data packets from the terminal device to the master access node 104 and at least one secondary access node 104A, 104B in the multi-connectivity scenario described above in connection with FIG. 2B.

Referring to FIG. 3A, the process comprises in a first access node, e.g. the master access node 114: transmitting (block 300), to a second access node 114A or 114B, a first message comprising at least one information element indicating whether or not the second access node is enabled to decide an activation status of a subset of transmission legs configured to deliver duplicates of data packets with a terminal device; transmitting (block 302), to the terminal device, a second message comprising at least one information element indicating activation of at least one transmission leg to deliver a duplicate of a data packet from the terminal device to the first access node, and communicating (block 304), with the terminal device, at least one duplicate of the data packet over the at least one transmission leg.

Referring to FIG. 4, the process comprises in the second access node, e.g. the secondary access node 114A or 114B: receiving (block 400), from the first access node, a first message comprising at least one information element indicating whether or not the second access node is enabled to decide an activation status of a subset of transmission legs configured to deliver duplicates of data packets from a terminal device; transmitting (block 402), to the terminal device, a second message comprising at least one information element indicating activation of at least one transmission leg of the subset to deliver a duplicate of a data packet between the terminal device and the second access node, and communicating (block 404), with the terminal device, at least one duplicate of the data packet over the at least one transmission leg.

Referring to FIG. 5A, the process comprises in the terminal device 100: receiving (block 500), from the first access node, a first message comprising at least one information element indicating activation of at least one transmission leg of a first subset of transmission legs to deliver a duplicate of a data packet between the terminal device and the first access node; receiving (block 504), from the second access node 104A or 104B, a second message comprising at least one information element indicating activation of at least one transmission leg of a second subset of transmission legs to deliver a duplicate of a data packet between the terminal device and the secondary access node; communicating (block 502) with the master access node at least one duplicate of the data packet over the at least one transmission leg indicated in the first message, and communicating (block 506) with the secondary access node at least one duplicate of the data packet over the at least one transmission leg indicated in the second message.

As illustrated in FIG. 5A, blocks 500 and 504 may be executed in an arbitrary order without creating any conflict because each node may address a different subset of transmission legs. The terminal device may receive the first message before the second message or vice versa, or even receive the first message and the second message concurrently via the different radio channels established with the different access nodes 104 and 104A/104B.

In the embodiments of FIGS. 3A, 4, and 5A, the master access node may coordinate the responsibility of making decisions regarding the activation status of the transmission legs and, accordingly, configure the other (secondary) access node in block 300. An advantage is flexible control of the uplink duplication in the multi-connectivity scenario. Another advantage is clear and unambiguous responsibility in making the decisions regarding the activation status of the transmission legs.

Figure 3B:
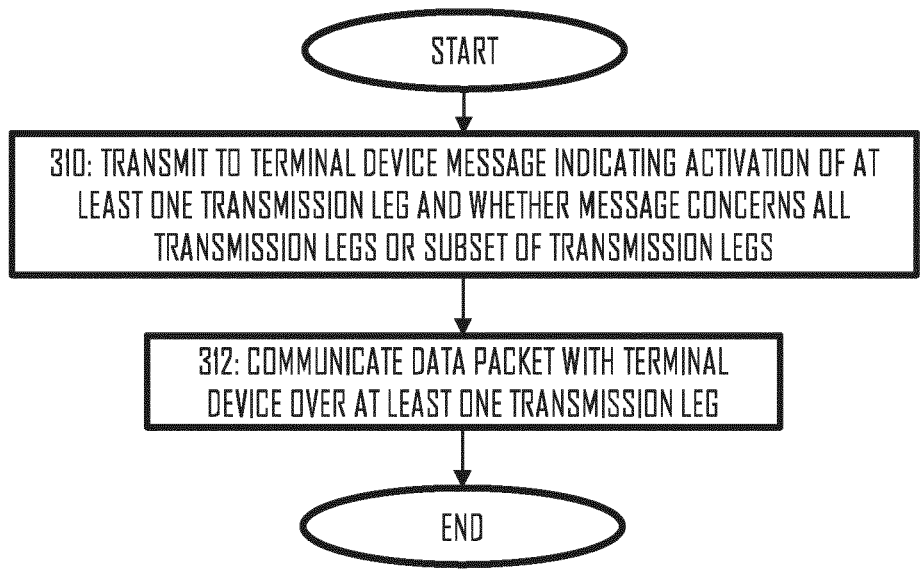
Figure 5B:
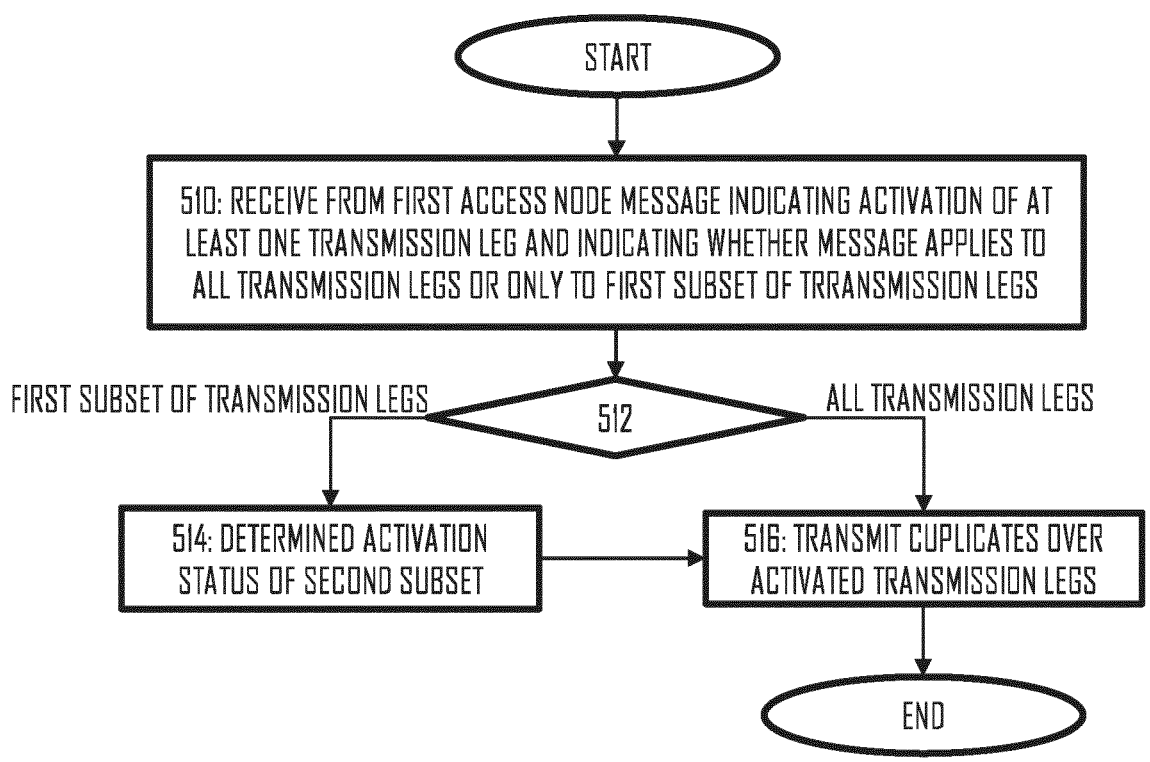

FIGS. 3B and 5B illustrate another embodiment of the invention. FIG. 3B illustrates a process from a perspective of an access node, e.g. one of the above-described access nodes, and FIG. 5B illustrates a process performed by the terminal device.

Referring to FIG. 3B, the access node may perform the following: transmitting (block 310), to a terminal device, a first message comprising a first information element indicating activation of at least one transmission leg configured to deliver a duplicate of a data packet between the terminal device and the access node, wherein the first message further comprises a second information element indicating whether or not the first message applies to all transmission legs configured at the terminal device to deliver duplicates of data packets or only to a first subset of the transmission legs; and communicating (block 312) with the terminal device a duplicate of the data packet over the at least one transmission leg indicated by the first information element.

Referring to FIG. 5B, the process executed by the terminal device comprises: receiving (block 510), from a first access node, a first message comprising a first information element indicating activation of at least one transmission leg configured to deliver a duplicate of a data packet between the terminal device and the first access node, wherein the first message further comprises a second information element indicating whether or not the first message applies to all transmission legs configured at the terminal device to deliver duplicates of data packets or only to a first subset of the transmission legs; if the second information element indicates that the first message applies to all transmission legs, communicating (block 516) at least one duplicate of the data packet over the at least one transmission leg indicated by the first information element; if the second information element indicates that the first message applies only to the first subset of the transmission legs, determining (block 514), an activation status of at least one transmission leg of a second subset of transmission legs on the basis of a second message received from a second access node, the second message comprising a third information element indicating activation of the at least one transmission leg of the second subset of the transmission legs, and communicating (block 516) duplicates of the data packet over the transmission legs indicated by the first information element and the third information element.

In block 512, the decision of whether to proceed to block 514 or 516 is made on the basis of the second information element. The first access node may be the master access node 104 and the second access node may be a secondary access node.

Above and in the description below, all transmission legs may be understood to refer to all transmission legs of a data radio bearer established between the first and second access nodes and the terminal device. The terminal device may have established another data radio bearer that may have separate transmission legs. From another perspective, all transmission legs may be understood to refer to all transmission legs of the same PDCP entity.

In an embodiment of FIG. 5B, step 514 may include receiving the second message from the second access node after receiving the first message from the first access node, and making the determination then. In another embodiment, step 514 includes maintaining the activation status of the at least one transmission leg of the second subset of transmission legs as a response to the first message. For example, at the time of receiving the first message, a certain activation status may have been determined for the second subset of transmission legs. Since the first message applies only to the first subset, the activation status of the second subset may be maintained intact. The activation status of the second subset may have been indicated before the first message by the second access node or even by the first access node. In the latter example, the terminal device may maintain the activation status decided by the first access node for the second subset before the first message until the second access node transmits the second message indicating a new activation status for the second subset.

In the description below, the embodiments are described in the context where the transmission direction is uplink. The principles apply to downlink transmission analogously. Furthermore, the embodiments are described in the context where the first access node is the master access node and the second access node is the secondary access node. In other embodiments, the master access node may be replaced or supplemented by an access node hosting a packet data convergence protocol layer of the terminal device. In the same manner, the secondary access node may be replaced or supplemented by an access node not hosting the packet data convergence protocol layer of the terminal device.

Figure 6A:
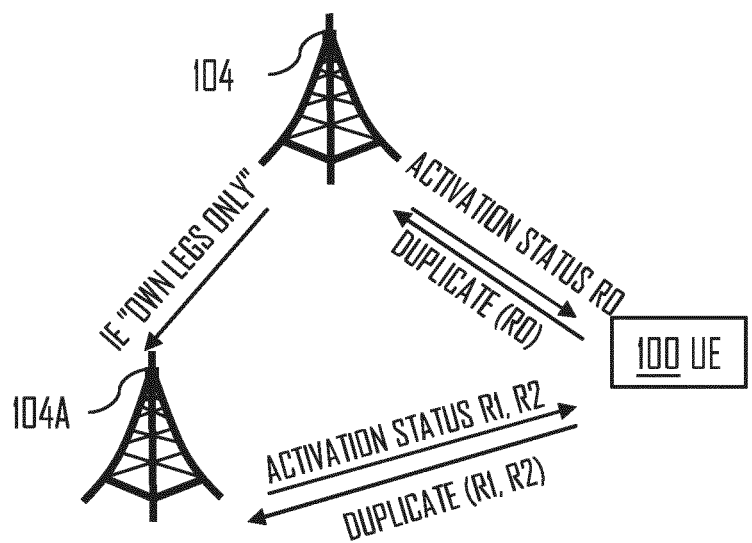
FIGS. 6A and 6B illustrate embodiments of indicating the activation status and transmitting duplicates of an uplink data packet via activated transmission legs.
Figure 6B:
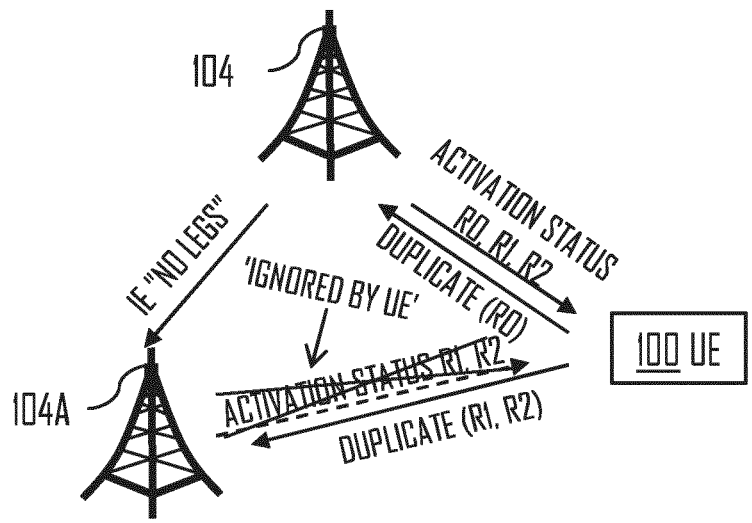

FIGS. 6A and 6B illustrate some embodiments for indicating the activation status of the transmission legs to the terminal device 100. In the embodiment of FIG. 6A, the master access node enables the secondary access node 104A to decide the activation status of the transmission legs managed by one or more RLC entities of the secondary access node 104A, while the master access node decides the activation status of the transmission legs managed by one or more RLC entities of the master access node 104. Accordingly, the master access node may enable in block 300 the secondary access node 104A to decide the activation status of only the transmission legs established via the secondary access node.

Let us assume that a transmission leg R0 is associated with a transmission leg established between the master access node 104 and the terminal device, while transmission legs R1 and R2 are established between the secondary access node 104A and the terminal device. Accordingly, the master access node indicates the activation status of the transmission leg R0 to the terminal device (block 302) and the secondary access node 104A indicates the activation status of the transmission legs R1, R2 to the terminal device (block 402). Depending on the activation status of the transmission legs R0, R1, R2, the terminal device then forms a corresponding number of duplicates of an uplink data packet and transmits one or more duplicates to the respective access node or access nodes via activated transmission legs, as illustrated in FIG. 6A.

FIG. 6B illustrates an embodiment where the master access node disables (in block 300) the secondary access node 104A with respect to making the decisions on the activation status of the transmission legs. In other words, the master access node assumes the responsibility of making the decisions for all transmission legs of the terminal device 100, including the transmission legs established between the secondary access node 104A and the terminal device. Upon receiving the first message disabling the decision-making, the secondary access node 104A should disable the decision-making and omit execution of block 402. Thus, the master access node transmits in block 302 the activation status of all transmission legs R0, R1, R2 to the terminal device. The terminal device then forms a corresponding number of duplicates of an uplink data packet and transmits one or more duplicates to the respective access node or access nodes via activated transmission legs, as illustrated in FIG. 6B.

In an embodiment, the master access node indicates in the second message transmitted in block 302 that the message applies to all transmission legs configured to deliver duplicates of data packets from the terminal device. As a consequence, the terminal device also gains knowledge that the master access node makes the decisions for all transmission legs. Therefore, even if the secondary access node would transmit the activation status information regarding the transmission legs R1, R2, the terminal device would ignore the activation status indicated by the secondary access node 104A, as illustrated in FIG. 6B. Such a scenario may exist when the master access node and the secondary access node are from different infrastructure vendors, for example. In the described manner, confusion of contradicting instructions may be avoided.

In an embodiment, the master access node explicitly instructs the terminal device to ignore any activation status information transmitted by the secondary access node or by other access nodes. Such an instruction may be transmitted via radio resource control signaling or via a MAC control element described below.

Figures 7, 8:
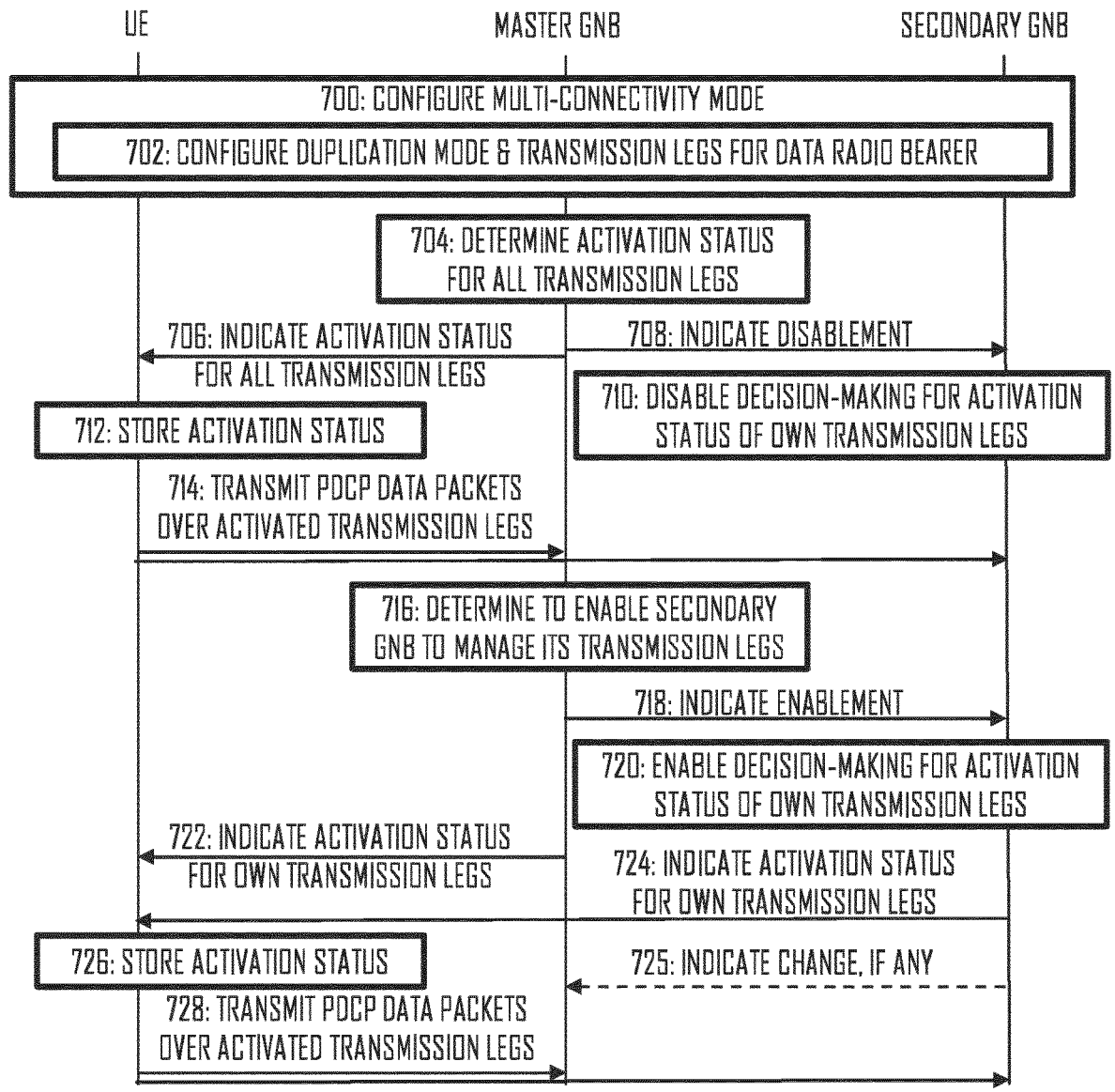
FIG. 7 illustrates an embodiment of a procedure of dynamically reconfiguring a decision policy regarding an activation status of transmission legs established with the terminal device.
FIG. 8 illustrates an embodiment of a control message comprising at least one information element indicating an activation status for at least one transmission leg.

Let us now illustrate embodiments of FIGS. 3 to 5 by referring to FIG. 7 showing an example of a signaling chart and providing examples for the embodiments. The procedure may start with the establishment of the multi-connectivity mode for the terminal device 100 in block 700. Block 700 may comprise establishing a data radio bearer with the terminal device. The data radio bearer may comprise multiple transmission legs for the terminal device, wherein at least one transmission leg is established between the master access node and the terminal device, and at least one transmission leg is established between the secondary access node and the terminal device. In block 702, a packet duplication mode is configured for the terminal device. Configuring the packet duplication mode may include configuring the PDCP layer of the terminal device to transmit data packets as multiple duplicates over multiple independent radio communication paths, as described above. Furthermore, the PDCP layer at the master access node may be configured to carry out PDCP data packet combining for such duplicate data packets.

In block 704, the master access node may initiate the packet duplication to operate in a mode where the master access node decides the activation status for all transmission legs of the terminal device. Accordingly, the master access node may transmit to the secondary access node in step 708 a message comprising an information element indicating that the activation status decision of transmission legs at the secondary access node is disabled.

The information element delivered in step 708 may be called Duplication Activation Signaling Allowance, for example, and it may be a two-bit indicator having a dedicated value for the following cases:

| Value | Description |
|---|---|
| 00 | No transmission legs |
| 01 | Own transmission legs only |
| 10 | Subset of transmission legs |
| 11 | All transmission legs |

Value '00' indicates that the activation status decision for transmission legs is disabled for the secondary access node. Value '01' indicates that the activation status decision for transmission legs is enabled for only those transmission legs established at the secondary access node, i.e. the secondary access node does not decide the activation status for transmission legs established between the master access node and the terminal device. Value '10' indicates that the activation status decision for transmission legs is enabled for only a subset of transmission legs, and the message may further identify the subset of transmission legs for which the secondary access node is enabled to decide the activation status. Value '11' indicates that the activation status decision for transmission legs is enabled for all transmission legs at the secondary access node, i.e. the secondary access node is enabled to decide the activation status for also the transmission leg or legs established between the master access node and the terminal device. It should be appreciated that mapping between the value and the description may be different from that in the above Table.

Upon receiving the information element in step 708, the secondary access node disables the decision-making regarding the activation status of the transmission legs of the terminal device 100.

Meanwhile, the master access node may decide the activation status of all transmission legs of the terminal device and transmit to the terminal device a message indicating the activation status of the transmission legs (step 706), e.g. the activation status of the transmission legs R0, R1 and R2. FIG. 8 illustrates an embodiment of such a message transmitted to the terminal device in step 706 (or in block 302). The message may be a MAC control element (CE). A logical channel identifier (LCID) field may identify the type of the MAC CE. The message may further comprise a data radio bearer identifier (DRB ID) field carrying an identifier of a data radio bearer associated with the MAC CE. By using the value of the DRB ID field, the terminal device acquires information on the related DRB and the transmission legs configured for this DRB.

There are a number of embodiments for indicating the duplication activation status to the UE, e.g. in step 302 and/or 402. The message, conveyed via e.g. a MAC CE, may comprise an information element 'CG' (CG for cell group) indicating whether the message concerns all transmission legs or only the transmission legs between the terminal device and the transmitter of the message (the master access node in step 706). In an embodiment, the activation status of each transmission leg may be indicated as a bitmap in the message (R0, R1, R2 in FIG. 8), wherein a bit of the bitmap is dedicated for each transmission leg. For example, the information elements R0, R1, R2 inform a 3-bit bitmap that indicates the activation status of the RLC entities (transmission legs) R0, R1, and R2, respectively. For example, when the terminal device receives the message from the master access node 104 deciding the activation status for R0, the terminal device may read only a value in the field R0 of the received message. Even if fields R1 and R2 be present and contain a value, the terminal device may ignore such values, as described above and maintain the current activation status of the transmission legs R1, R2 intact. The same applies to a message received from the secondary access node managing the activation status of the transmission legs R1, R2: the terminal device may ignore a value in field R0, if present. The same applies to all decision policies illustrated in the Table above. The decision policy may be signaled to the terminal device and the terminal device follows the decision policy when changing the activation status of the transmission legs in response to the messages received from the access nodes, i.e. the terminal device applies only those changes indicated by an access node that has a responsibility to decide the activation status of particular one or more transmission legs.

The information elements R0, R1, R2 may have a further function, as described below.

In an embodiment, the information on the transmission legs to which the message (e.g. MAC CE) applies is indicated by a value of the LCD. For example, one value of the LCID may be dedicated to 'indicating activation status for all transmission legs', while another value of the LCID may be dedicated to 'indicating activation status for a subset of transmission legs' such as own transmission legs. In similar manner, a dedicated value of the LCID field may be arranged for all options of Table above. Accordingly, the terminal device may read the value of the LCID field of a message and determine on that basis the transmission legs to which the activation status indicated in the message applies and, therefore, control the activation status of only those transmission legs.

In an embodiment related to the option 'subset of transmission legs' in the Table above and, particularly to the case where the subset includes transmission legs from multiple access nodes or only a subset of transmission legs hosted by an access node, the access node deciding the activation status for the subset may also indicate the subset in the message transmitted in step 302/402, or in another message. The message indicating the subset may be transmitted via the RRC signaling, or a dedicated field for specifying the subset may be provided in the MAC CE, e.g. the CG field.

In an embodiment, the message further comprises an information element indicating whether or not the terminal device shall ignore contradicting activation status decisions made by another access node or nodes, e.g. the secondary access node. The information element may be a one-bit indicator. For example, the master access node may indicate in a message an activation status for all transmission legs and, further, indicate that the terminal device shall not follow contradicting activation status decisions made by other access node(s). Then, the terminal device may operate according to the embodiment of FIG. 6B. On the other hand, the master access node may indicate in a message an activation status for all transmission legs and, further, indicate that the terminal device is allowed to follow contradicting activation status decisions made by other access node(s). Then, upon receiving from the secondary access node a message indicating a change to an activation status of at least one transmission leg, the terminal device may change the activation status of the at least one transmission leg, thus overruling the decision made by the master access node. The same principle applies to the situations where the master access node indicates the activation status for a subset of transmission legs, allowing the secondary access node to overrule the decision.

The terminal device may further determine on the basis of the DRB ID field whether or not the transmitter of the message is a master access node. If the transmitter of the message is the master access node, the information in the message may overrule all previous activation status information, e.g. in a case of contradicting activation status information. In this manner, the terminal device may, for example, ignore the activation status information received from a secondary access node without enablement by the master access node, as described above in connection with FIG. 6B.

An alternative to indicating the activation status to the terminal device via the MAC CE is by using higher layer signaling, e.g. radio resource control (RRC) signaling.

In step 712, since the master access node indicated in step 706 that the message concerns the activation status of all transmission legs, the terminal device stores the activation status of all transmission legs on the basis of the message received in step 706. When performing the next uplink data transmission(s), the terminal device transmits (step 714) a duplicate of an uplink data packet to each transmission leg indicated as activated in the message of step 706. Some of the duplicates may be transmitted to the master access node while other one or more duplicates may be transmitted to the secondary access node, depending on the activation status of the transmission legs. In this manner, the terminal device may carry on with performing the duplicate transmissions of data packets by using the transmission legs activated in step 706. The activation status may thus be considered as a semi-static parameter.

In block 716, the master access node determines to change the decision-making policy and to enable the secondary access node to manage the activation status of the transmission legs established between the secondary access node and the terminal device. The decision may be based on an attempt to reduce the latency of uplink data transmission by enabling a quicker use of a more optimal subset of transmission legs associated to the secondary access node, or to reduce signaling traffic in the interface between the access nodes. When the decision of the activation status of all transmission legs is decided in the master access node, the secondary access node may be configured to deliver to the master access node channel quality information of a radio channel between the secondary access node and the terminal device. The master access node may then use such information when deciding the activation status of the transmission legs established at the secondary access node. For example, a transmission leg experiencing poor channel conditions may be disabled (i.e. deactivated) until the channel conditions improve. In block 718, the master access node transmits to the secondary access node a message indicating enablement of the decision-making regarding the own transmission legs of the secondary access node.

Upon receiving the message in step 718, the secondary access node enables the decision-making function in block 720. Thereafter, the secondary access node decides the activation status for only the transmission legs established for the terminal device at the secondary access node, and indicates the determined activation status to the terminal device in step 724. In a similar manner, the master access node may determine the activation status for only the transmission legs established for the terminal device at the master access node, and indicates the determined activation status to the terminal device in step 722. In steps 722 and 724, the control element of FIG. 8 may be used where the CG field of each control element is set to indicate 'own transmission legs only'. As a consequence, the terminal device reads only the activation status for the transmission legs established with the master access node from a control element received from the master access node, while ignoring the field relating to the activation status for the transmission legs established with the secondary access node. Similarly, the terminal device only reads the activation status for the transmission legs established with only the secondary access node from a control element received from the secondary access node, while ignoring the field relating to the activation status for the transmission legs established with the master access node. In step 726, the terminal device stores the activation status for the transmission legs, and transmits in step 728 duplicates of a subsequent uplink data packet by using the updated activation status stored in step 726.

In this manner, the procedure may continue. If the master access node determines to assume full control of deciding the activation status of all transmission legs of the terminal device, it may execute block 704 and 708 again.

In an embodiment, the secondary access node is configured to report the current decision on the activation status of the transmission legs for which the secondary access node makes the decisions. As a consequence, if the secondary access node has decided to change the active set of transmission legs in step 724 from the active set previously reported to the master access node, the secondary access node may execute step 725 in which the secondary access node reports the change in the active set of transmission legs. Upon receiving the report in step 725, the master access node may determine whether or not to change the activation status of the current set of transmission legs managed by the master access node, and/or whether or not to change the decision policy and the enablement of the secondary access node in the decision-making. The master access node may execute block 704 or 716 on the basis of such a report, for example.

Upon receiving the report in step 725, the master access node may determine whether or not to overrule the decision made by the secondary access node. Upon determining to overrule the decision, the master access node may determine the transmission legs having the activation status that shall be overruled and transmit to the terminal device a message indicating the overruled activation status for the determined transmission legs. The message may be the above-described MAC CE where the field 'CG' may be configured to specify the subset of transmission legs and to indicate the transmission legs for which the decision made by the secondary access node shall be overruled. The bitmap may then define the new activation status for those transmission legs.

In an embodiment of steps 716, 718, the master access node may determine and indicate at least some limits for the decisions regarding the activation status to be made by the secondary access node. The master access node may, for example, set and define a minimum number of activated transmission legs or a maximum number of activated transmission legs. As another example, the master access node may define a minimum number of activated transmission legs per access node, e.g. at least one active transmission leg per access node. In this manner, the master access node may ensure sufficient diversity without micromanaging the activation status of all individual transmission legs. This may apply to any decision-making policy of the Table above where the secondary access node makes the decisions regarding the activation status.

In an embodiment, the master access node enables the secondary access node to decide the activation status of all transmission legs of the terminal device, including the transmission legs established at the master access node. The procedure may follow the principles of FIG. 7, with the modification that the master indicates in a message transmitted to the secondary access node such enablement and that the secondary access node performs the step 706.

In an embodiment, the master access node enables the secondary access node to decide the activation status of a subset of transmission legs of the terminal device, wherein the subset differs from the set of transmission legs established at the secondary access node. In such a case, the master access node may employ a modification of block 716 by determining the subset and a modification of step 718 by defining the subset explicitly or implicitly in the message transmitted to the secondary access node. The subset may consist of at least one transmission leg established at the secondary access node and/or at least one transmission leg established at the master access node. The subset may include a subset of all transmission legs of the terminal device, established at the secondary access node, and/or a subset of all transmission legs of the terminal device established at the master access node.

In an embodiment, the master access node enables the secondary access node to decide the activation status of the subset of transmission legs but, instead of the secondary access node indicating the decisions directly to the terminal device, the secondary access node reports the decisions to the master access node and the master access node signals the decisions to the terminal device. The master access node may thus aggregate the decisions made by itself and by the secondary access node into one message and indicate the aggregated decisions to the terminal device. In such a case, the master access node may set the information element 'CG' to indicate 'all transmission legs' although the secondary access node makes decisions regarding the subset of transmission legs. In another embodiment, the master access node may indicate to the terminal device in a message the activation status of only those transmission legs having the activation status decided by the secondary access node. Upon receiving such a message, the terminal device may maintain the current activation status of those transmission legs for which the master access node itself makes the decisions.

In an embodiment, the master access node may, in connection with step 718, indicate to the terminal device that the secondary access node shall from now on decide the activation status of a subset of transmission legs. This indication may be transmitted in a message transmitted between steps 716 and 722, i.e. before the message of step 722. In another embodiment, this indication is provided in the message of step 722.

In an embodiment, the master access node receives radio measurement data from the secondary access node before making a decision regarding an activation status of one or more transmission legs established for the terminal device at the secondary access node. For example, upon disabling the decision-making in the secondary access node in block 710, the secondary access node may start reporting the radio measurement data to the master access node. The radio measurement data may represent a channel quality of a radio channel between the terminal device and the secondary access node. Such measurement data may include a received signal strength indicator, a measured signal-to-noise ratio etc. As a consequence, the master access node has better information on which to base the decision regarding the activation status of the transmission legs established at the secondary access node.

Figure 9:
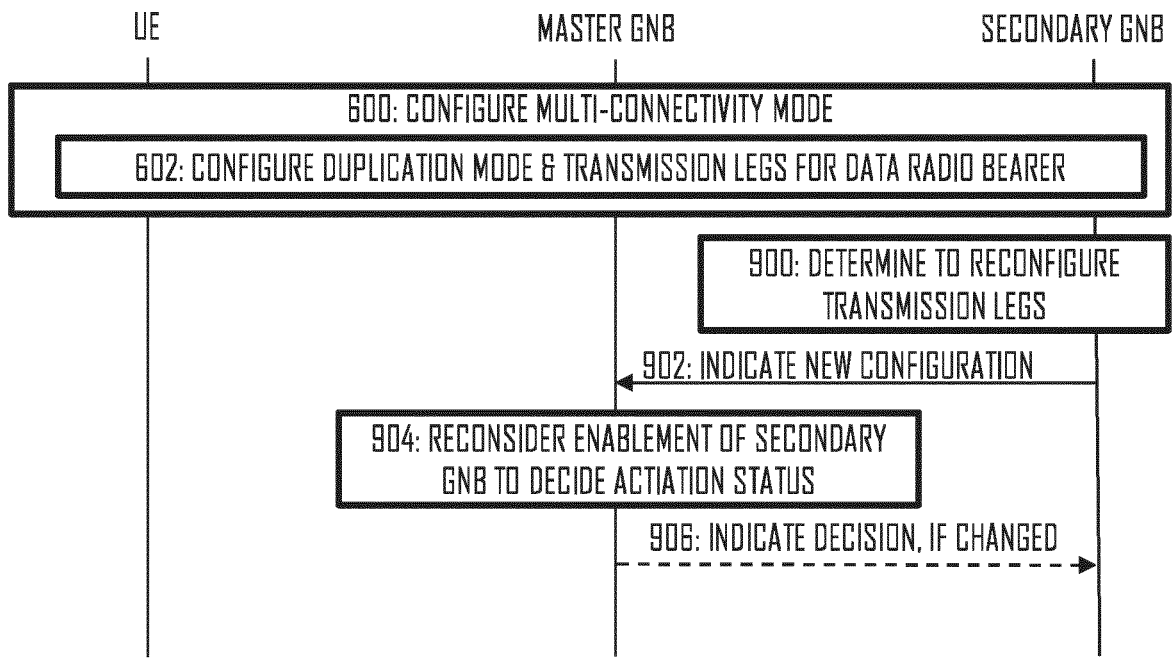
FIG. 9 illustrates an embodiment of a procedure for reporting a reconfiguration of transmission legs to a master access node by a secondary access node.

FIG. 9 illustrates an embodiment where the secondary access node determines to reconfigure the transmission legs of the terminal device. Referring to FIG. 9, the secondary access node may determine to perform the reconfiguration in block 900. The reconfiguration may include at least one of the following functions: add a new transmission leg for the terminal device, remove at least one of the currently established transmission legs for the terminal device, a change in the set of activated transmission legs for duplication.

Upon determining to perform the reconfiguration but before performing the reconfiguration, or upon performing the reconfiguration, the secondary access node may transmit to the master access node a message indicating the reconfiguration and the new configuration (to be) performed by the secondary access node (step 902). Upon receiving the message in step 902, the master access node may reconsider the current enablement regarding the decisions of the activation status of the transmission legs (block 904). If the master access node determines the maintain the current decision policy, the procedure may end. Upon determining to change the decision policy, the master access node may determine the new policy and transmit to the secondary access node a message indicating the new decision policy. The new policy may disable the decision-making in the secondary access node, as in step 708, or it may enable the decision-making for at least some of the transmission legs, as in step 718. Thereafter, the procedure may follow in the above-described manner where each access node decides the activation status of the transmission legs according to the new decision policy.

In an embodiment, the secondary access node triggers step 902 only upon the change caused by the reconfiguration meets a determined criterion. For example, a minor change in the transmission legs may not trigger step 902, but a major change will trigger step 902. The minority/majority may be determined in terms of a number of changes, e.g. a number of transmission legs for which the activation status is changed since the latest execution of step 902 and/or a number of added/removed transmission legs.

Figure 10:
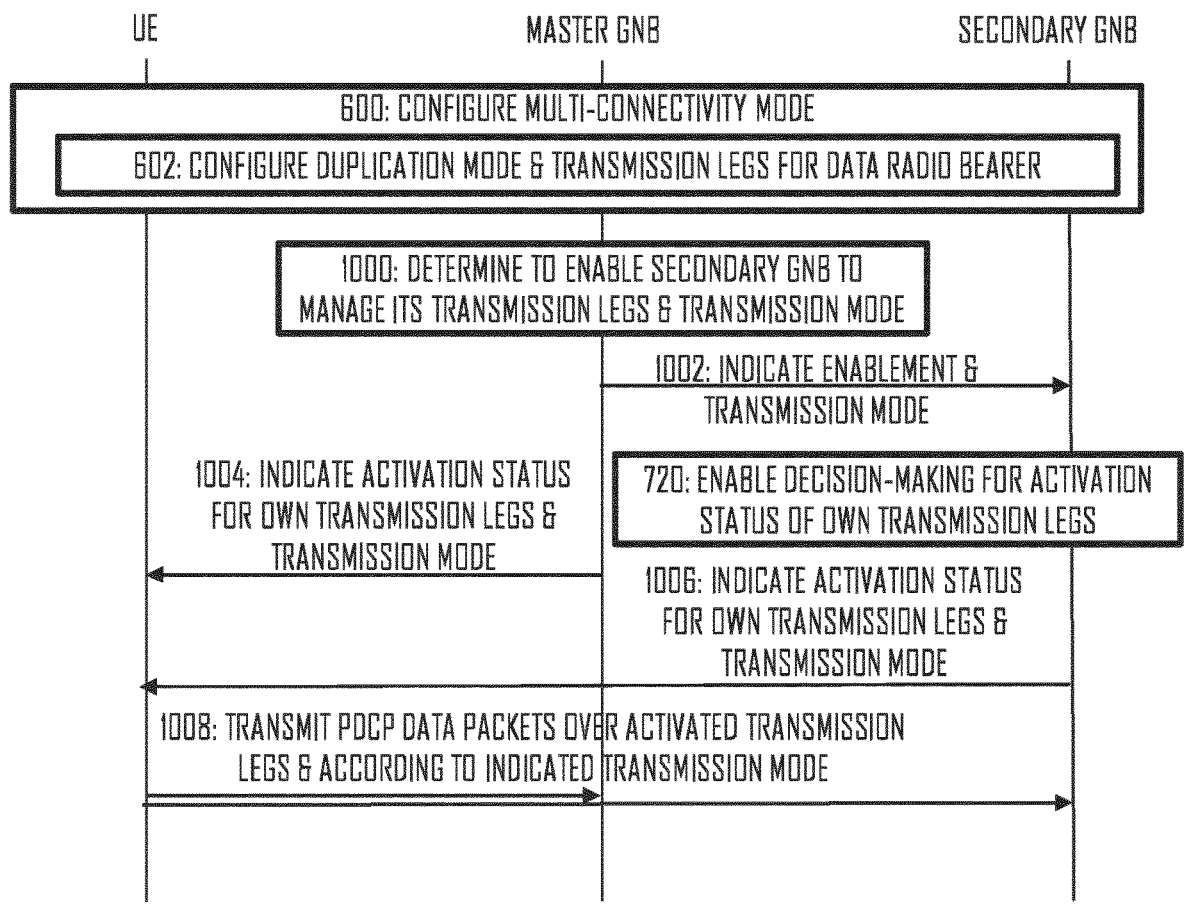
FIG. 10 illustrates an embodiment of a procedure for indicating a transmission mode for one or more activated transmission legs.

In an embodiment, a message indicating the activation status (step 302 or 402) or enablement for the decision-making regarding the activation status (step 300 or 400) further comprises at least one information element indicating a transmission mode for transmitting the duplicates of the data packets over the subset of transmission legs, wherein the transmission mode is one of at least a first transmission mode and a second transmission mode, wherein the terminal device shall transmit duplicates simultaneously over all activated transmission legs of the subset in the first transmission mode, and wherein the terminal device shall transmit at least one duplicate over one activated transmission leg of the subset after another duplicate over another activated transmission leg of the subset in the second transmission mode. FIG. 10 illustrates a signaling diagram of such an embodiment.

Referring to FIG. 10, the master access node determines to enable the secondary access node to make decisions regarding the activation status of at least some of the transmission legs of the terminal device and, further, determines a transmission mode for the at least some transmission legs (block 1000). The transmission mode may be selected amongst a set of transmission modes including the first transmission mode and the second transmission mode, for example. In step 1002, the master access node indicates the result of block 1000 to the secondary access node, e.g. the selected transmission mode and the enablement to make the decisions. Upon receiving the message in step 1002, the secondary access node may make the enablement of the decision-making in block 720. The transmission mode may be indicated separately and independently for each transmission leg. A different transmission mode may be assigned to different transmission legs, as described above, or the master access node may define specifications for the secondary access node to select the transmission mode for the transmission legs for which the secondary access node may decide the activation status.

Let us assume that each of the master access node and the secondary access node decides the activation status of only own transmission legs, respectively. The embodiment is equally applicable to the other decision-making policies of the Table above.

In step 1004, the master access node indicates the activation status of the transmission leg(s) established for the terminal device at the master access node and, further, indicates the transmission mode of that/those transmission leg(s). Similarly, the secondary access node indicates the activation status of the transmission leg(s) established for the terminal device at the secondary access node and, further, indicates the transmission mode of that/those transmission leg(s) (step 1006). The message transmitted in step 1004 and in step 1006 may be the control element of FIG. 8 where the transmission mode is indicated in the information elements R0, R1, R2. Let us assume that the master access node decides the activation status for the transmission leg R0. As a consequence, upon receiving the message in step 1004 the terminal device reads the element CG to determine that the control element indicates the transmission mode for only the transmission leg R0 linked to the master access node. Accordingly, the terminal device reads the transmission mode for the transmission leg R0 from the information element R0. Similarly, upon receiving the message in step 1004 the terminal device reads the element CG to determine that the control element indicates the transmission mode for only the transmission leg R0 linked to the master access node. Accordingly, the terminal device reads the transmission mode for the transmission leg R0 from the information element R0. Similarly, upon receiving the message in step 1006 the terminal device reads the element CG to determine that the control element indicates the transmission mode for only the transmission legs R1, R2 linked to the secondary access node. Accordingly, the terminal device reads the transmission mode for the transmission legs R1, R2 from the information elements R1, R2.

Let us assume that all transmission legs R0, R1, R2 have been indicated as active and, as a consequence, the terminal device will transmit duplicates over all transmission legs R0, R1, R2 (step 1008). If all information elements R0, R1, R2 indicate the first transmission mode, the terminal device will transmit the duplicates of the subsequent uplink data packet substantially simultaneously over the activated transmission legs R0, R1, R2. If one of the information elements R0, R1, R2 indicates the second transmission mode, e.g. R2, while the other information elements indicate the first transmission mode for the other transmission legs R0, R1, the terminal device may first transmit two duplicates of the uplink data packet over the transmission legs R0, R1 and, thereafter, another duplicate of the uplink data packet over the transmission leg R2. The transmission of the duplicate over the transmission leg may be triggered upon a determined time interval (counted by a timer at the terminal device) has expired from the transmissions over the legs R0, R1. Alternatively, the transmission of the duplicate over the transmission leg may be triggered upon receiving a negative acknowledgment (NACK) for both transmission legs R0, R1 from the respective access nodes. If a positive acknowledgment (ACK) is received for either or both transmission legs R0, R1, transmission over the transmission leg R2 may be skipped. The transmission leg R2 may thus serve as a reserve for the case where the transmission over the other transmission legs fails.

In another embodiment, the first transmission mode is selected for only one of the transmission legs while the second transmission leg is selected for all the other transmission legs. As a consequence, if the first transmission over the one of the transmission legs fails, multiple copies are then transmitted as the reserve.

Figure 11:
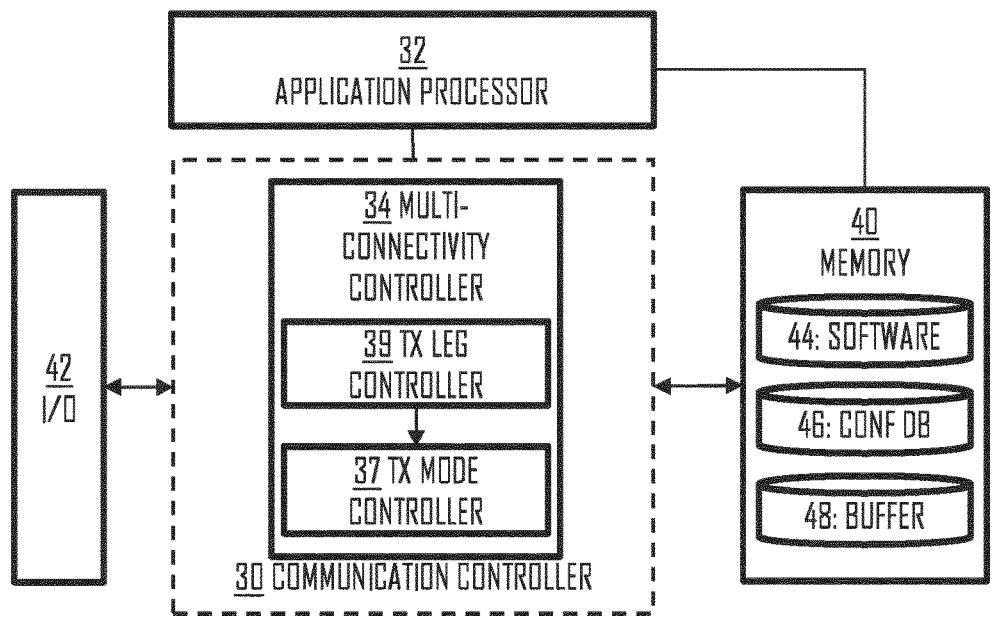
FIGS. 11 to 13 illustrate apparatuses according to some embodiments.
Figure 12:
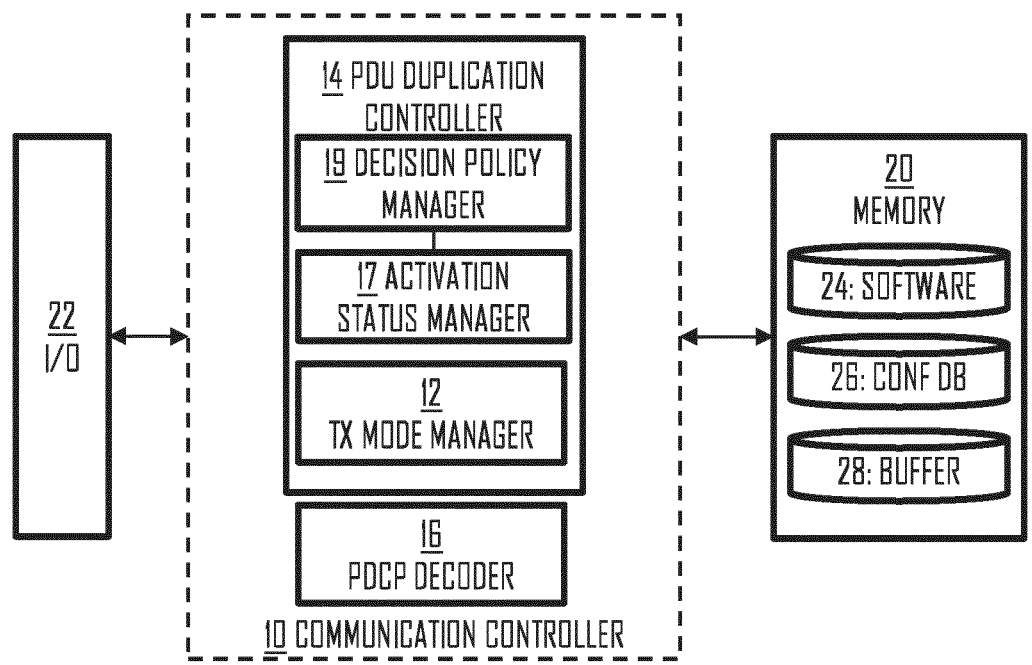
Figure 13:
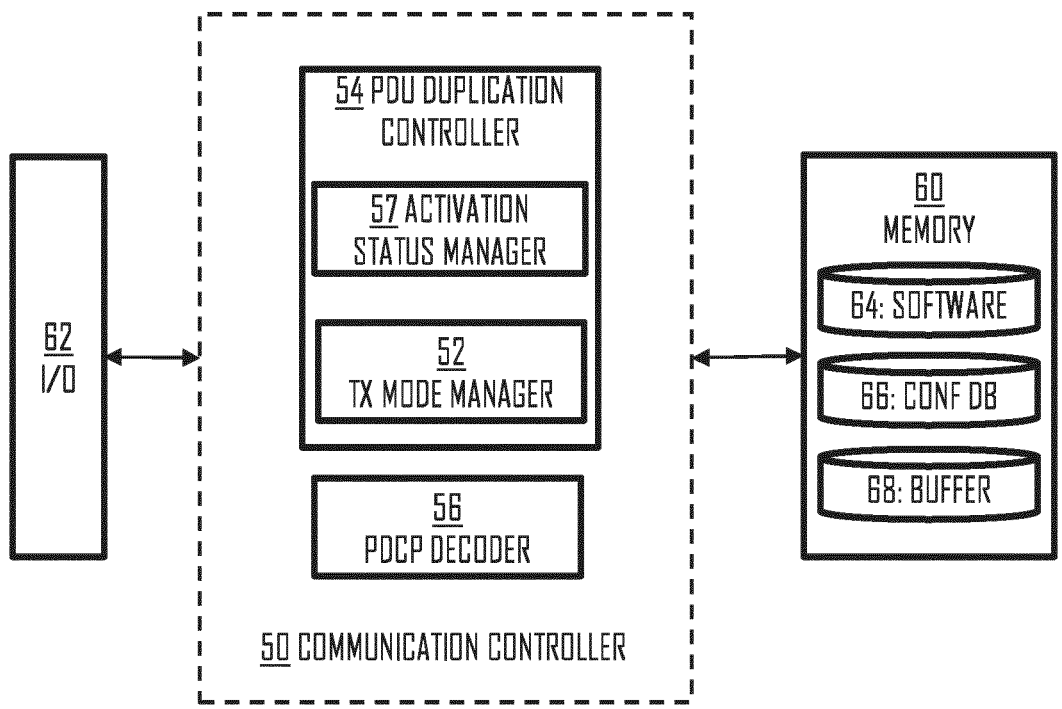

FIGS. 11 to 13 illustrate apparatuses comprising a communication controller 10, 30, 50, such as at least one processor or processing circuitry, and at least one memory 20, 40, 60 including a computer program code (software) 24, 44, 64, wherein the at least one memory and the computer program code (software) are configured, with the at least one processor, to cause the respective apparatus to carry out any one of the embodiments described above. FIG. 11 illustrates an apparatus for the terminal device, FIG. 12 illustrates an apparatus for the master access node (e.g. the gNB) or a controller controlling the operation of the master access node according to the embodiments of the invention, and FIG. 13 illustrates an apparatus for the secondary access node (e.g. the gNB) or a controller controlling the operation of the secondary access node according to the embodiments of the invention. The apparatuses of FIGS. 11 to 13 may be electronic devices.

Referring to FIGS. 11 to 13, the memory 20, 40, 60 may be implemented using any suitable data storage technology, such as semiconductor based memory devices, flash memory, magnetic memory devices and systems, optical memory devices and systems, fixed memory and removable memory. The memory may comprise a configuration database 26, 44, 66 for storing configuration parameters, e.g. the activated transmission leg(s) and/or respective transmission mode(s). The memory 20, 40, 60 may further store a data buffer 28, 48, 68 for data waiting for transmission.

Referring to FIG. 11, the apparatus may further comprise a communication interface 42 comprising hardware and/or software for realizing communication connectivity according to one or more radio communication protocols. The communication interface 42 may provide the apparatus with radio communication capabilities with one or more access nodes of a wireless network. The communication interface 42 may support the above-described multi-connectivity and/or carrier aggregation concepts. In an embodiment, the communication interface 42 comprises one or more antenna arrays providing the apparatus with capability of forming directive transmission radio beams and the reception radio beams. The communication interface may comprise standard well-known analog radio components such as an amplifier, filter, frequency-converter and circuitries, conversion circuitries transforming signals between analog and digital domains, and one or more antennas. Digital signal processing regarding transmission and reception of signals may be performed in the communication controller 30.

The communication controller 30 may comprise a multi-connectivity controller 34 configured to manage the one or more radio links, one or more radio bearers, and/or one or more transmission legs configured in the terminal device. The multi-connectivity controller 34 may also control transmission of the duplicate data packets, as described above. The controller 34 may comprise a transmission leg controller 39 configured to perform blocks 500 to 506 or 510 to 516, for example, and instruct the communication interface 42 to transmit the duplicates of uplink data packets via the activated transmission legs indicated in blocks 500, 504. In an embodiment, the controller 34 further comprises a transmission mode controller 37 configured to control the transmission mode of the activated transmission legs. The information on the activated transmission legs may be received from the transmission leg controller 39. The transmission mode controller may control the transmission over the activated transmission legs according to respective transmission modes (step 1008).

The apparatus may further comprise an application processor 32 executing one or more computer program applications that generate a need to transmit and/or receive data through the access nodes. The application processor may form an application layer of the apparatus. The application processor may execute computer programs forming the primary function of the apparatus. For example, if the apparatus is a sensor device, the application processor may execute one or more signal processing applications processing measurement data acquired from one or more sensor heads. If the apparatus is a computer system of a vehicle, the application processor may execute a media application and/or an autonomous driving and navigation application.

Referring to FIGS. 12 and 13, the apparatus for the access nodes comprises a communication interface 22, 62 comprising hardware and/or software for realizing communication connectivity according to one or more radio communication protocols. The communication interface 22, 62 may provide the apparatus with communication capabilities to terminal devices camping in one or more cells controlled by the respective access node. In an embodiment, the communication interface may comprise one or more antenna arrays providing the apparatus with capability of forming directive transmission radio beams and the reception radio beams. The communication interface may comprise standard well-known components such as an amplifier, filter, frequency-converter, (de)modulator, and encoder/decoder circuitries and one or more antennas. The communication interface 22, 62 may be configured to control operation of the one or more antenna arrays for providing the radio beams.

The communication controller 10 may be configured to carry out the embodiment of FIG. 3, and the communication controller 50 is configured to carry out the embodiment of FIG. 4. The communication controller 10 may comprise a protocol data unit (PDU) duplication controller 14 that manages the duplicate transmissions of a given PDU. The controller 14 may comprise a decision policy manager configured to execute any one or more of blocks 704, 716, 904, 1000 and to control the transmission of the first message in block 300. The controller 14 may further comprise an activation status manager 17 configured to determine an activation status for transmission legs for which the decision policy manager has authorized the decision-making at the master access node. The activation status manager may thus control the transmission of the second message to the terminal device in block 302. The controller 14 may further comprise a transmission mode manager 12 configured to execute the selection of the transmission mode in block 1000, as described above.

The communication controller 10 may further comprise a PDCP decoder 16 configured to receive one or more duplicates of uplink data packets from the terminal device via the activated transmission legs, and to decode and optionally combine the duplicates.

The communication controller 50 of the secondary access node may comprise a PDU duplication controller 54 managing the duplicate transmissions by the secondary access node under the control of the master access node, as described above. The PDU duplication controller 54 may, for example, receive and apply the decision policy received from the master access node in block 400. The controller 54 may comprise an activation status manager 57 configured to determine an activation status for transmission legs for which the master access node has authorized the decision-making at the secondary access node. The activation status manager may thus control the transmission of the activation status to the terminal device in block 402, step 724, or step 1006. The controller 54 may further comprise a transmission mode manager 52 configured to execute the selection of the transmission mode, as described above.

At least some of the functionalities of the apparatus of FIG. 12 or 13 may be shared between two physically separate devices, forming one operational entity. Therefore, the apparatus may be seen to depict the operational entity comprising one or more physically separate devices for executing at least some of the processes described with respect to the access nodes. An apparatus utilizing such shared architecture, may comprise a remote control unit (RCU) or central unit (CU), such as a host computer or a server computer, operatively coupled (e.g. via a wireless or wired network) to a remote radio head (RRH) or distributed unit (DU), such as a Transmission Reception Point (TRP), located in the access node, e.g. the gNB 104, 104A, 104B. An RCU may generate a virtual network through which the RCU communicates with an RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into a server computer or a host computer (i.e. to the RCU). External network virtualization is targeted to optimized network sharing. Another category is internal virtual networking which provides network-like functionality to the software containers on a single system. A virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

At least some of the processes described above may be performed by the RCU or shared among the RRH and the RCU.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 3 to 10 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 3 to 10 or operations thereof.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 3 to 10, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 3 to 10 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus for a first access node, comprising:
at least one processor; and
at least one memory including computer program code, the at least one memory and computer program code being configured, with the at least one processor, to cause the apparatus to perform:
transmitting, to a second access node, a first message comprising at least one information element indicating activation status decision enablement for transmission legs configured to deliver duplicates of data packets from a terminal device;
depending on the activation status decision enablement, transmitting, to the terminal device, a second message comprising at least one information element indicating activation status of at least one transmission leg to deliver a duplicate of a data packet from the terminal device, wherein the activation status of the at least one transmission leg is decided by the first access node, wherein the activation status decision for the transmission legs is enabled for only those transmission legs established at the second access node; and
receiving, from the second access node, radio measurement data indicating quality of a radio channel of the transmission legs and deciding the activation status of the transmission legs on the basis of the radio measurement data.

2. The apparatus of claim 1, wherein the activation status decision for the transmission legs is disabled for the second access node.

3. The apparatus of claim 1, wherein the activation status decision for the transmission legs is enabled for only a subset of the transmission legs, wherein the first message further identifies the subset of the transmission legs for which the secondary access node is enabled to decide the activation status.

4. The apparatus of claim 1, wherein the activation status decision for the transmission legs is enabled for all the transmission legs for the secondary access node.

5. The apparatus of claim 1, wherein the at least one memory and computer program code are further configured, with the at least one processor, to cause the apparatus to perform receiving a third message from the second access node, wherein the third message comprises at least one information element indicating a change in the activation status of the transmission legs; changing a number of transmission legs on the basis of the received third message; and transmitting to the second access node a fourth message indicating a new number of transmission legs.

6. The apparatus of claim 1, wherein the first message further comprises at least one information element indicating a transmission mode, wherein the transmission mode is one of at least a first transmission mode and a second transmission mode, wherein duplicates are transmitted simultaneously over all activated transmission legs in the first transmission mode, and wherein at least one duplicate is transmitted over one activated transmission leg after another duplicate over another activated transmission leg in the second transmission mode.

7. The apparatus of claim 1, wherein the second message further comprises an information element indicating whether or not the terminal device shall ignore contradicting activation status decisions made by the second access node.

8. An apparatus for a first access node, comprising:
at least one processor; and
at least one memory including computer program code, the at least one memory and computer program code being configured, with the at least one processor, to cause the apparatus to perform:
receiving, from a second access node, a first message comprising at least one information element indicating activation status decision enablement for transmission legs configured to deliver duplicates of data packets from a terminal device;
based on the activation status decision enablement, transmitting, to the terminal device, a second message comprising at least one information element indicating activation status of at least one transmission leg to deliver a duplicate of a data packet from the terminal device, wherein the activation status of the at least one transmission leg is decided by the first access node, wherein the activation status decision for the transmission legs is enabled for only those transmission legs established at the second access node, and
sending, to the second access node, radio measurement data indicating quality of a radio channel of the transmission legs for deciding the activation status of the transmission legs on the basis of the radio measurement data.

9. The apparatus of claim 8, wherein the activation status decision for the transmission legs is disabled for the first access node.

10. The apparatus of claim 8, wherein the activation status decision for the transmission legs is enabled for only those transmission legs established at the first access node.

11. The apparatus of claim 8, wherein the activation status decision for the transmission legs is enabled for only a subset of the transmission legs, wherein the first message further identifies the subset of the transmission legs for which the first access node is enabled to decide the activation status.

12. The apparatus of claim 8, wherein the activation status decision for the transmission legs is enabled for all the transmission legs for the first access node.

13. The apparatus of claim 8, wherein the at least one memory and computer program code are further configured, with the at least one processor, to cause the apparatus to perform changing the activation status of at least one transmission leg, and transmitting to the second access node a third message comprising at least one information element indicating the change in the activation status of the at least one transmission leg.

14. The apparatus of claim 8, wherein the second message further comprises at least one information element indicating a transmission mode, wherein the transmission mode is one of at least a first transmission mode and a second transmission mode, wherein duplicates are transmitted simultaneously over all activated transmission legs in the first transmission mode, and wherein at least one duplicate is transmitted over one activated transmission leg after another duplicate over another activated transmission leg in the second transmission mode.

15. An apparatus for a terminal device, comprising:
at least one processor; and
at least one memory including computer program code, the at least one memory and computer program code being configured, with the at least one processor, to cause the apparatus to perform:
receiving, from anyone of a first and a second access node, a first message comprising at least one information element indicating activation status of transmission legs, hosted by anyone of the first and the second access node, to deliver a duplicate of a data packet between the terminal device and anyone of the first and the second access node,
transmitting to anyone of the first and the second access node duplicate of the data packet over activated transmission legs,
wherein the first message further comprises a second information element indicating whether the first message applies to all the transmission legs or only to a subset of the transmission legs,
wherein the first message further comprises an information element indicating whether or not the apparatus ignores contradicting activation status decisions made by any one of the first and the second access node, and wherein the at least one memory and computer program code are further configured, with the at least one processor, to cause the apparatus to perform solving a contradictive indication on the basis of the information element.

16. The apparatus of claim 15, wherein if the second information element of the first message indicates that the first message applies only to the subset of the transmission legs configured to deliver duplicates of data packets, the at least one memory and computer program code are further configured, with the at least one processor, to cause the apparatus to perform ignoring the activation status of the transmission legs not in the subset.

17. The apparatus of claim 15, wherein the first message comprises an information element indicating a transmission mode, wherein the transmission mode is one of at least a first transmission mode and a second transmission mode, wherein duplicates are transmitted simultaneously over all activated transmission legs in the first transmission mode, and wherein at least one duplicate is transmitted over one activated transmission leg after another duplicate over another activated transmission leg in the second transmission mode.

* * * * *